United States Patent
Zohrevand et al.

(10) Patent No.: US 12,423,599 B2
(45) Date of Patent: Sep. 23, 2025

(54) EFFICIENT AND ACCURATE REGIONAL EXPLANATION TECHNIQUE FOR NLP MODELS

(71) Applicant: Oracle International Corporation, Redwood Shores, CA (US)

(72) Inventors: Zahra Zohrevand, Vancouver (CA); Tayler Hetherington, Vancouver (CA); Karoon Rashedi Nia, Vancouver (CA); Yasha Pushak, Vancouver (CA); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 988 days.

(21) Appl. No.: 17/212,163

(22) Filed: Mar. 25, 2021

(65) Prior Publication Data

US 2022/0309360 A1    Sep. 29, 2022

(51) Int. Cl.
    *G06N 5/04*    (2023.01)
    *G06F 40/20*   (2020.01)
    *G06N 20/00*   (2019.01)

(52) U.S. Cl.
    CPC ............... *G06N 5/04* (2013.01); *G06F 40/20* (2020.01); *G06N 20/00* (2019.01)

(58) Field of Classification Search
    CPC ........... G06N 5/04; G06N 20/00; G06F 40/20
    See application file for complete search history.

(56) References Cited

U.S. PATENT DOCUMENTS

| 6,789,069 B1 | 9/2004 | Barnhill |
| 8,489,603 B1 | 7/2013 | Weissgerber |

(Continued)

FOREIGN PATENT DOCUMENTS

WO    WO 2018/006004 A1    1/2018

OTHER PUBLICATIONS

Ushioda, A. (Jun. 1996). Hierarchical clustering of words and application to NLP tasks. In Fourth Workshop on Very Large Corpora. (Year: 1996).*

(Continued)

*Primary Examiner* — Michael J Huntley
*Assistant Examiner* — Maggie Thanh Maido
(74) *Attorney, Agent, or Firm* — Hickman Becker Bingham Ledesma LLP; Brian Miller

(57) ABSTRACT

Herein are techniques for topic modeling and content perturbation that provide machine learning (ML) explainability (MLX) for natural language processing (NLP). A computer hosts an ML model that infers an original inference for each of many text documents that contain many distinct terms. To each text document (TD) is assigned, based on terms in the TD, a topic that contains a subset of the distinct terms. In a perturbed copy of each TD, a perturbed subset of the distinct terms is replaced. For the perturbed copy of each TD, the ML model infers a perturbed inference. For TDs of a topic, the computer detects that a difference between original inferences of the TDs of the topic and perturbed inferences of the TDs of the topic exceeds a threshold. Based on terms in the TDs of the topic, the topic is replaced with multiple, finer-grained new topics. After sufficient topic modeling, a regional explanation of the ML model is generated.

24 Claims, 12 Drawing Sheets

(56) References Cited

U.S. PATENT DOCUMENTS

| | | | |
|---|---|---|---|
| 10,705,796 | B1 | 7/2020 | Doyle |
| 2006/0080311 | A1 | 4/2006 | Potok |
| 2008/0027926 | A1 | 1/2008 | Diao |
| 2009/0274376 | A1 | 11/2009 | Selvaraj |
| 2010/0145678 | A1* | 6/2010 | Csomai .............. G06F 40/169 704/10 |
| 2012/0089621 | A1 | 4/2012 | Liu |
| 2013/0158982 | A1 | 6/2013 | Zechner |
| 2016/0180200 | A1 | 6/2016 | Vijayanarasimhan |
| 2016/0187022 | A1 | 6/2016 | Miwa |
| 2017/0091692 | A1 | 3/2017 | Guo |
| 2017/0344822 | A1 | 11/2017 | Popescu |
| 2018/0018320 | A1* | 1/2018 | Boyer .................. G06F 16/35 |
| 2018/0175975 | A1 | 6/2018 | Um |
| 2019/0130212 | A1 | 5/2019 | Cheng |
| 2019/0197357 | A1 | 6/2019 | Anderson et al. |
| 2020/0110982 | A1 | 4/2020 | Gou |
| 2020/0226212 | A1* | 7/2020 | Tan .................... G06F 18/214 |
| 2020/0302318 | A1 | 9/2020 | Hetherington |
| 2020/0387675 | A1* | 12/2020 | Nugent ................ G06N 3/045 |
| 2021/0049503 | A1* | 2/2021 | Nourian ............ G06F 11/3466 |
| 2022/0229983 | A1 | 7/2022 | Zohrevand et al. |
| 2023/0259707 | A1* | 8/2023 | Joshi .................. G06N 20/00 704/9 |

OTHER PUBLICATIONS

Lawrie, D., Croft, W. B., & Rosenberg, A. (Sep. 2001). Finding topic words for hierarchical summarization. In Proceedings of the 24th annual international ACM SIGIR conference on Research and development in information retrieval (pp. 349-357). (Year: 2001).*

Menon, A., Narasimhan, H., Agarwal, S., & Chawla, S. (May 2013). On the statistical consistency of algorithms for binary classification under class imbalance. In International Conference on Machine Learning (pp. 603-611). PMLR. (Year: 2013).*

Röder, M., Both, A., & Hinneburg, A. (Feb. 2015). Exploring the space of topic coherence measures. In Proceedings of the eighth ACM international conference on Web search and data mining (pp. 399-408). (Year: 2015).*

Alvarez-Melis, D., & Jaakkola, T. S. (Nov. 2017). A causal framework for explaining the predictions of black-box sequence-to-sequence models. arXiv preprint arXiv:1707.01943. (Year: 2017).*

Korenčić, D., Ristov, S., & Šnajder, J. (Jul.2018). Document-based topic coherence measures for news media text. Expert systems with Applications, 114, 357-373. (Year: 2018).*

Greco, S. (2019). Explaining black-box models in the context of Natural Language Processing (Doctoral dissertation, Politecnico di Torino). (Year: 2019).*

Ren, S., Deng, Y., He, K., & Che, W. (Jul. 2019). Generating natural language adversarial examples through probability weighted word saliency. In Proceedings of the 57th annual meeting of the association for computational linguistics (pp. 1085-1097). (Year: 2019).*

Carbonero-Ruz, M., Martínez-Estudillo, F. J., Fernández-Navarro, F., Becerra-Alonso, D., & Martínez-Estudillo, A. C. (Dec. 2016). A two dimensional accuracy-based measure for classification performance. Information Sciences, 382, 60-80. (Year: 2016).*

Amer, A. A., & Abdalla, H. I. (Sep. 2020). A set theory based similarity measure for text clustering and classification. Journal of Big Data, 7(1), 74. (Year: 2020).*

Koh et al., Understanding Black-box Predictions via Influence Functions, From the 34th International Conference on Machine Learning, Sydney, Australia, PMLR 70, dated Dec. 29, 2020, 12 pages.

Jin et al., "Data discretization unification", Regular Paper, Springer-Verlag London Limited 2008, 29 pages.

Holte, Robert, "Very Simple Classification Rules Perform Well on Most Commonly Used Datasets", 1993 Kluwer Academic Publishers, Boston. Manufactured in The Netherlands, 28 pages.

Heusel et al., "GANs Trained by a Two Time-Scale Update Rule Converge to a Local Nash Equilibrium", 31st Conference on Neural Information Processing Systems (NIPS 2017), Long Beach, CA, USA, 12 pages.

Hand et al., "Data Mining." Wiley StatsRef: Statistics Reference Online (2014): 1-7.

Das et al., "Opportunities and Challenges in Explainable Artificial Intelligence (XAI): A Survey", dated Jun. 23, 2020, 24 pages.

Breiman, Leo. "Random forests." Machine learning 45.1, dated Jan. 2001, 33 pages.

Zintgraf et al., "Visualizing Deep Neural Network Decisions: Prediction difference analysis" dated Feb. 15, 2017, 12 pages.

"Decision Trees", dated Jan. 26, 2005, 10 pages.

Agrawal et al., "Fast Discovery of Association Rules", dated 1996, 22 pages.

Akoglu, Haldun, "User's Guide to Correlation Coefficients", Turkish Journal of Emergency Medicine 18, dated 2018, pp. 91-93.

Baehrens et al., "How to Explain Individual Classification Decisions", Journal of Machine Learning Research 11 dated 2010, 29 pages.

Goodfellow et al., "Generative Adversarial Nets", dated 2014, 9 pages.

Bloniarz et al., "Supervised Neighborhoods for Distributed Nonparametric Regression", Proceedings of the 19th International Conference on Artificial Intelligence and Statistics dated 2016, 10 pages.

Goodfellow et al., "Explaining and Harnessing Adversarial Examples", Published as a conference paper at ICLR dated 2015, 11 pages.

Dhurandhar et al., "Explanations based on the Missing: Towards Contrastive Explanations with Pertinent Negatives", dated 2018, 12 pages.

Dougherty et al., "Supervised and Unsupervised Discretization of Continous Features", dated 1995, 9 pages.

Dua, D. and Graff, C., "Uci Machine Learning Repository" [http://archive.ics.uci.edu/ml]. Irvine, CA: University of California, School of Information and Computer Science, dated 2019, 2 pages.

Egan et al., "Generalized Latent Variable Recovery for Generative Adversarial Networks", dated Oct. 19, 2018, 9 pages.

Fayyad, "Multi-Interval Discretization of Continuous-Valued Attributed for Classification Learning", dated 1993, 6 pages.

Lundberg et al., "A Unified Approach to Interpreting Model Predictions", 31st Conference on Neural Information Processing Systems (NIPS 2017), dated 2017, Long Beach, CA, USA, 10 pages.

Bakarov, Amir. "A Survey of Word Embeddings Evaluation Methods." dated Jan. 21, 2018, 26 pages.

Vanschoren et al., "OpenML: Networked Science in Machine Learning", dated Aug. 1, 2014, 12 pages.

Lipton et al., "Precise Recovery of Latent Vectors From Generative Adversarial Networks", Workshop track—ICLR dated Feb. 17, 2017, 4 pages.

Tenney et al., "What Do You Learn From Context?", Published as a conference paper at ICLR 2019, dated May 15, 2019, 17 pages.

Turney et al., "From Frequency to Meaning: Vector Space Models of Semantics.", Journal of artificial intelligence research 37, dated Mar. 4, 2010, 48 pages.

UCI Machine Learning Repository, "SMS Spam Collection Data Set", https://archive.ics.uci.edu/ml/datasets/SMS+Spam+Collection, dated Jun. 22, 2012, 2 pages.

UCI Machine Learning Repository, "Twenty Newsgroups Data Set", https://archive.ics.uci.edu/ml/datasets/Twenty+Newsgroups, dated Sep. 9, 1999, 2 pages.

Strumbelj et al., "Explaining Predictions Models and Individual Predictions with Contributions", Knowledge and Information Systems 41.3, dated Dec. 2014, pp. 647-665.

Van Looveren et al., "Interpretable Counterfactual Explanations Guided by Prototypes", dated Feb. 18, 2020, 17 pages.

Strumbelj et al., "An Efficient Explanation of Individual Classifications Using Game Theory", Journal of Machine Learning Research 11, dated 2010, 18 pages.

Wachter et al., "Counterfactual Explanations Without Opening the Black Box: Automated Decisions and the GDPR", dated 2017, 52 pages.

(56) References Cited

OTHER PUBLICATIONS

Xu et al., "Modeling Tabular Data using Conditional GAN", 33rd Conference on Neural Information Processing Systems (NeurIPS 2019), dated 2019, Vancouver, Canada, 11 pages.
Yang et al., "HEIDL: Learning Linguistic Expressions with Deep Learning and Human-in-the-Loop", dated Jul. 25, 2019, 6 pages.
Yang, H., and John Moody. "Feature Selection Based on Joint Mutual Information." Proceedings of international ICSC symposium on advances in intelligent data analysis, dated 1999, 8 pages.
Yu et al. "Rethinking Cooperative Rationalization: Introspective Extraction and Complement Control". dated Dec. 15, 2019, 13 pages.
Zeiler, M. D., & Fergus, R., "Visualizing and Understanding Convolutional Networks", In European conference on computer vision, Springer, Cham., dated Nov. 28, 2013, 11 pages.
Utgoff, Paul, "Incremental Induction of Decision Trees", 1989 Kluwer Academic Publishers, Boston. Manufactured in The Netherlands, 26 pages.
Ribeiro et al., "Why Should I Trust You?" Explaining the Predictions of Any Classifier, KDD dated 2016 San Francisco, CA, USA, 10 pages.
Zhao et al., "Data-driven risk-averse stochastic optimization with Wasserstein metric", Operations Research Letters, dated 2018, 6 pages.
Pedregosa et al., "Scikit-learn: Machine Learning in Python", Journal of Machine Learning Research 12, dated 2011, 6 pages.
Plumb et al., "Model Agnostic Supervised Local Explanations", 32nd Conference on Neural Information Processing Systems (NeurIPS 2018), dated 2018, Montréal, Canada, 10 pages.
Quinlan et al., "Induction of Decision Trees", dated 1986 Kluwer Academic Publishers, Boston—Manufactured in The Netherlands, 26 pages.
Ramírez-Gallego et al., "Data discretization: taxonomy and big data challenge", WIREs Data Mining Knowl Discov 2015, 17 pages.
Sweke et al., "On the Quantum versus Classical Learnability of Discrete Distributions", dated Jul. 28, 2020, 27 pages.
Ribeiro et al., "Anchors: High-precision Model- agnostic Explanations", In Thirty-Second AAAI Conference on Artificial Intelligence, dated Apr. 2018, 9 pages.
Lundberg et al. "A Unified Approach to Interpreting Model Predictions". dated Nov. 25, 2017, In Advances in neural information processing systems, 10 pages.
Ribeiro et al., "Why Should I Trust You?" Explaining the Predictions of Any Classifier, Publication rights licensed to ACM, dated 2016, 10 pages.
Robnik-Sikonja et al., "Explaining Classifications for Individual Instances", IEEE Transactions on Knowledge and Data Engineering, 20:589-600, dated 2008, 24 pages.
Roth, Alvin, "The Shapley Value", Essays in honor of Lloyd S. Shapley, Cambridge University Press, dated 1988, 338 pages.
Samek et al., "Explainableartificialintelligence: Understanding, Visualizingand Interpreting Deep Learning Models", ITU Journal: ICT Discoveries, Special Issue No. 1, Oct. 13, 2017, 10 pages.
SciPy.Org, Statistical Functions (scipy.stats), https://scipy.org, SciPy v1.6.1, Feb. 2021, 10 pages.
Shapley, Lloyd S. "A Value for N-person Games", Contributions to the Theory of Games 2.28, dated Aug. 21, 1951, 19 pages.
Ribeiro et al., "Why should I trust you?" Explaining the predictions of any classifier. In Proceedings of the 22nd ACM SIGKDD, dated Aug. 2016, 10 pages.
Laugel. Local post-hoc interpretability for black-box classifiers. Machine Learning [cs.LG]. Sorbonne Universite (Year: 2020).

Saito et al., Improving LIME Robustness with Smarter Locality Sampling, arXiv.org, available at https://arxiv.org/pdf/2006.12302v2.pdf (revised Jul. 24, 2020).
Molnar et al., Limitations of Interpretable Machine Learning Methods, available at https://slds-lmu.github.io/iml_methods_limitations/ (Oct. 5, 2020).
Laugel et al., Defining Locality for Surrogates in Post-hoc Interpretablity, arXiv.org, available at https://arxiv.org/pdf/1806.07498.pdf (Jun. 19, 2018).
Lahiri A, Edakunni NU. Accurate and Intuitive Contextual Explanations using Linear Model Trees. arXiv preprint arXiv:2009.05322. Sep. 11, 2020, originally presented at KDD Workshop on ML in Finance 2020, Aug. 24, 2020 (Year: 2020).
Guidotti R, Monreale A, Ruggieri S, Pedreschi D, Turini F, Giannotti F. Local rule-based explanations of black box decision systems. arXiv preprint arXiv:1805.10820. May 28, 2018 (Year: 2018).
Deep Hyperspherical Learning, arXiv.org, available at https://arxiv.org/pdf/1711.03189.pdf (Jan. 30, 2018).
Github.com, "slundberg/shap", https://github.com/slundberg/shap/blob/master/shap/explainers/_permutation.py, updated on Nov. 17, 2020, 5 pages.
Lin et al., "Experiencing SAX: a novel symbolic representation of time series", Data Min Knowl Disc (2007), 38 pages.
Letham et al., "Interpretable classifiers using rules and Bayesian analysis: Building a better stroke prediction model", vol. 9, No. 3, dated 2015, 2 pages.
Letham et al., "Interpretable Classifiers Using Rules and Bayesian Analysis: Building a Better Stroke Prediction Model", The Annals of Applied Statistics, dated 2015, vol. 9, No. 3, 23 pages.
Laugel et al., "Defining Locality for Surrogates in Post-hoc Interpretablity", dated Jun. 19, 2018 ICML Workshop on Human Interpretability in Machine Learning (WHI 2018), 7 pages.
Laugel et al., "Comparison-based Inverse Classification for Interpretability in Machine Learning"., (IPMU 2018), dated Jun. 2018, Cadix, Spain, 12 pages.
Lakkaraju et al., "Interpretable Decision Sets: A Joint Framework for Description and Prediction", KDD, PMC dated Nov. 14, 2016, 24 pages.
Lakkaraju et al., "Interpretable Decision Sets: A Joint Framework for Description and Prediction", KDD '16, Aug. 13-17, 2016, San Francisco, CA, USA, 10 pages.
Lakkaraju et al., "Interpretable & Explorable Approximations of Black Box Models", KDD, dated 2017, 5 pages.
Wong et al., "A Vector Space Model for Automatic Indexing" Information Retrieval and Language Processing, Communications of ACM, dated Nov. 1975, vol. 18, No. 11, 8 pages.
Partalas et al., "LSHTC: A Benchmark for Large-Scale Text Classification", dated Mar. 30, 2015, 9 pages.
Gabrilovich et al., "Wikipedia-Based Semantic Interpretation for Natural Language Processing", Journal of Artificial Intelligence Research, vol. 34, dated 2009, 55 pages.
Gabrilovich et al., "Overcoming the Brittleness Bottleneck using Wikipedia: Enhancing Text Categorization with Encyclopedic Knowledge", dated 2006, 6 pages.
Gabrilovich et al., "Computing Semantic Relatedness using Wikipedia-based Explicit Semantic Analysis", dated Jan. 6, 2007, 6 pages.
Dong-Hyun Lee, "Multi-Stage Rocchio Classification for Large-scale Multilabeled Text data", 8 pages.
"Rocchio Classification", https://nlp.stanford.edu/IR-book/html/htmledition/rocchio-classification-1.html, last viewed on Jul. 6, 2017, 6 pages.
Mimno et al., "Optimizing Semantic Coherence in Topic Models" Proceedings of the 2011 Conference Empirical Methods in Language Processing, pp. 262-272.

\* cited by examiner

FIG. 5

EQUATION 501
$$\delta_{t_i, c_j} = \text{tfidf}_{t_i, c_j} - \left( \sum_{m \neq j} \text{tfidf}_{t_i, c_m} / (M - 1) \right)$$

EQUATION 502
$$T_1 = \bigcup_{j=1}^{M} T'_j, \quad I_1 = \bigcup_{j=1}^{M} I'_j$$

EQUATION 503
$$C'_{pred,m} = \{c'_j\}_{j=1}^{N} \mid c'_j : \begin{cases} 1 & \text{if } c_j = c_m \\ 0 & \text{else} \end{cases}$$

EQUATION 504
$$T_2 = \bigcup_{m=1}^{M} T'_m, \quad I_2 = \bigcup_{m=1}^{M} I'_m$$

EQUATION 505
$$Tok = T_1 \cup T_2, \quad I = I_1 \cup I_2$$

FIG. 7

TOPICS 700

| Topic | Tokens |
|---|---|
| T.1 | 0.408*space + 0.135*nasa + 0.078*lunar + 0.065*launch + 0.064*moon + 0.062*shuttle + 0.060*earth + 0.037*"station" + 0.019*solar |
| T.2 | 0.232*cancer + 0.230*medical + 0.177*health + 0.134*patients + 0.116*disease + 0.100*medicine + 0.006*drugs + 0.002*therapy |
| T.3 | 0.317*launch + 0.200*msg + 0.179*spacecraft + 0.122*earth + 0.082*solar + 0.061*flight + 0.033*orbit |
| T.4 | 0.118*banks + 0.117*gordon + 0.105*pitt + 0.103*blood + 0.101*skepticism + 0.099*intellect + 0.001*space + 0.001*skin + 0.000*space + 0.000*patient |
| T.5 | 0.391*doctor + 0.285*pain + 0.264*blood + 0.043*treatment + 0.001*patient + 0.001* patients + 0.001*medicine + 0.001*health + 0.001*medical |

EFFICIENT AND ACCURATE REGIONAL EXPLANATION TECHNIQUE FOR NLP MODELS

FIELD OF THE INVENTION

The present invention relates to regional explanations of machine learning (ML) inferencing. Herein are novel techniques based on topic modeling and content perturbation that provide ML explainability (MLX) for natural language processing (NLP).

BACKGROUND

Machine learning (ML) and deep learning are becoming ubiquitous for two main reasons: their ability to solve complex problems in a variety of different domains and growth in performance and efficiency of modern computing resources. However, as the complexity of problems continues to increase, so too does the complexity of the ML models applied to these problems.

Deep learning is a prime example of this trend. Other ML algorithms, such as neural networks, may only contain a few layers of densely connected neurons, whereas deep learning algorithms, such as convolutional neural networks, may contain tens to hundreds of layers of neurons performing very different operations. Increasing the depth of the neural model and heterogeneity of layers provides many benefits. For example, going deeper can increase the capacity of the model, improve the generalization of the model, and provide opportunities for the model to filter out unimportant features, while including layers that perform different operations can greatly improve the performance of the model. However, these optimizations come at the cost of increased complexity and reduced human interpretability of model operation.

Explaining and interpreting the results from complex deep learning models is a challenging task compared to many other ML models. For example, a decision tree may perform binary classification based on N input features. During training, the features that have the largest impact on the class predictions are inserted near the root of the tree, while the features that have less impact on class predictions fall near the leaves of the tree. Feature importance can be directly determined by measuring the distance of a decision node to the root of the decision tree.

Such models are often referred to as being inherently interpretable. However, as the complexity of the model increases (e.g., the number of features or the depth of the decision tree increases), it becomes increasingly challenging to interpret an explanation for a model inference. Similarly, even relatively simple neural networks with a few layers can be challenging to interpret, as multiple layers combine the effects of features and increase the number of operations between the model inputs and outputs. Consequently, there is a requirement for alternative techniques to aid with the interpretation of complex ML and deep learning models.

ML explainability (MLX) is the process of explaining and interpreting ML and deep learning models. MLX can be broadly categorized into local and global explainability:
  Local: Explain why an ML model made a specific prediction corresponding to a given sample to answer a question such as why did the ML model make a specific prediction.
  Global: Understand the general behavior of the ML model as a whole to answer questions such as how does the ML model work or what did the ML model learn from training data.

Natural language processing (NLP) and semantic analysis of text can be very complex and differ greatly from tabular data analytics. Tabular datasets are rigidly structured and have a clear definition of features (number of inputs, data types, value ranges, etc.). Explanation techniques, such as feature permutation importance, can exploit such structure to define how each feature is evaluated relative to an ML model's behavior. However, text datasets are unstructured. There is no inherent notion of a feature. Instead, each text document may consist of any number, order, or structure of text tokens. Consequently, an NLP ML model needs to be flexible enough to support a wide range of inputs where the structure is not known a priori (e.g., valid inputs could contain a single character, a few words, or thousands of sentences). This unstructured property of text data also significantly complicates MLX for NLP ML models, as there may be an infinite number of possible input combinations to evaluate. No existing feature attribution-based explanation techniques are directly applicable to textual datasets. Moreover, there are a large number of different types of tasks in the context of NLP or text analytics, such as classifying or clustering text, chatbot messaging, providing recommendations, or extracting information or concepts. Each of these tasks may entail different preprocessing stages, NLP models, and types of outputs generated in a text processing pipeline.

A global explanation of an NLP ML model is a matter of ongoing research. LIME and SHAP are MLX frameworks with extensions to aggregate multiple local explanations. These aggregation-based methods face two main challenges. First, finding the most revealing regions in a multidimensional space of linguistic semantics is not straightforward and not solved by aggregation of local explanations. Second, such aggregate local explanation techniques suffer from: (a) poor runtime performance (it can be very time consuming to compute the local explanations for all documents in a dataset); (b) low-quality explanations (the local, and hence aggregated, explanations frequently contain unimportant tokens that were mistaken as important); and (c) stability issues (due to approximations in the local explanation approaches, accumulating an aggregated explanation based on many flawed local explanations that are biased from repeated use of a same dataset can result in very different explanations for a same model when a different dataset is later used).

Recently, techniques to explain the inner mechanisms of deep NLP models (e.g., model-specific explanations) have attracted more attention. Examples of such techniques are edge probing, which explains contextualized word embeddings; influence functions, which provides explanations for differentiable models; and introspective explanations, which provide targeted techniques to explain particular model architectures. Despite the improved capabilities of these techniques, they are all examples of model-specific approaches, which are only applicable to specific NLP ML models. HEIDL is another NLP explanation technique that brings the human into the loop by allowing manual review of internal rules of natural language labels generated by a deep learning model trained on human-labeled data. However, HEIDL requires a large amount of computational resources and is also dependent on the type of ML model being explained.

There are many challenges and limitations with existing NLP MLX solutions. Both local and global explanation techniques suffer some limitations in terms of achieving an acceptable balance between coverage, fidelity, interpretability, and stability; these important metrics determine the usefulness of an explanation. Intuitively, more stable explanations tend to be more trustworthy. Specifically, receiving a different explanation for a same model and text lowers confidence in explanations. Coverage measures the percentage of documents in the dataset for which a same provided explanation holds (i.e., the extent of the observations to which the explainer's interpretation applies to NLP ML model behavior).

On one hand, the explanation provided by a global explainer may not effectively represent the model's behavior through different regions of the dataset. For example, an NLP ML model may utilize different sets of text tokens in one region versus another. Thus, tokens detected by an attributive explainer do not necessarily contribute to characterizing all documents in a dataset. On the other hand, local explanations may be too narrow to represent NLP ML model behavior even in a very small neighborhood. For example, the sentence "Do not say this book is good, because it is not!" may confuse sentiment analysis that detects the word "good". Explaining an NLP ML model's decision by only focusing on a closed set of documents that include the whole token set of {'book', 'not', 'good', 'is'} as contributive factors might not be generalizable to very similar sentences (e.g., "This book's terrible.").

A major challenge with considering global importance of text tokens is an assumption that each token has one, and only one, meaning. For example, "running" implies quite different meanings in the phrase "running is good for your health" versus "running for office is difficult." A global explainer may associate "running" with exercise, while the latter has nothing to do with that concept. By limiting analysis to a single document, LIME and SHAP are methods that significantly reduce the number of possible input combinations to evaluate. For example, if a document only contains 15 words, only different combinations of these 15 words need evaluation. Such simplifying efficiencies are generally unavailable for generating non-local explanations.

BRIEF DESCRIPTION OF THE DRAWINGS

In the drawings:

FIG. 5 depicts example mathematical equations;

FIG. 7 depicts an example regional explanation;

DETAILED DESCRIPTION

Figure 1:
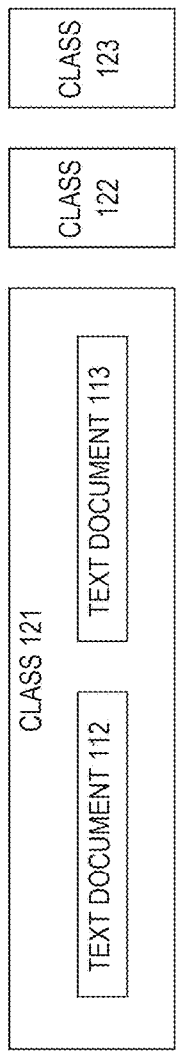
FIG. 1 is a block diagram that depicts an example computer that performs topic modeling and content perturbation that provide machine learning explainability (MLX) for natural language processing (NLP)

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

For natural language processing (NLP) models and text analytics, herein is an efficient and accurate regional explanation approach that focuses on model-agnostic explanations. A novel end-to-end regional text explanation technique is included that efficiently explains the behavior of any NLP machine learning (ML) classification, clustering, or regression model on large text datasets by discovering the most significant topics (semantic regions) and the text tokens that most influence the ML model's predictions in the discovered regions of subject matter semantics. Text tokens also known as terms are the most fine-grained building blocks of the NLP model, such as sentences, words, or characters. A candidate token extractor is used to efficiently and accurately identify an initial set of important tokens with which to perform topic discovery from the ML model's perspective.

The novel, model-agnostic regional explanation technique is called regional text perturbation importance (RTPI) that identifies influential text tokens in NLP ML tasks based on different regions of textual datasets. Unlike most solutions, RTPI is model-agnostic (not tied to a specific ML model) and is able to treat any arbitrary combination of a text processing pipeline and NLP model as a black box. Thus, there are two main inputs to this ML global explainer, which are the textual dataset and the already trained black-box ML model (including the text preprocessing steps). Here, a black box is broadly intended to include an NLP ML model and none, some, or all of a text preprocessing pipeline whose syntactic granularities and transformations need not match those of techniques herein. For example, it does not matter if the ML model and preprocessing pipeline are based on sentences and an embodiment of the approach herein is based instead on words or vice versa. In any case, black box means that both the NLP ML model and the text preprocessing pipeline may be opaque and have an internal architecture and configuration that are hidden or confusingly complex.

The approach herein is itself implemented as a processing pipeline consisting of some major stages:

1. Candidate Token Extractor: Processes the raw input text documents and provides an initial set of influential text tokens across all documents in the dataset.
2. Topic Modeler: Discovers important topics in the pruned data based on the extracted tokens. Then it classifies the documents based on their representative topic.

3. Document Perturber: Applies a systematic approach for generating new documents to evaluate the quality of discovered topics. For each topic, it applies a selective token perturbation algorithm across the available tokens within the topic.
4. Evaluator: It compares the labels assigned by the black-box NLP model to the perturbed documents versus the original predicted labels. Incoherent topics identified by the Evaluator should be returned to the Topic Modeler to extract finer-grained topics such as subtopics.

None of the existing global explainers are able to provide a comprehensive yet interpretable explanation. Also, most of the existing global explanation techniques suffer from poor runtime performance and low-quality explanations. RTPI addresses these limitations as follows:

Spatial and temporal efficiency. Using the candidate token extractor's results, RTPI limits its search space to model topics based on a set of influential tokens.

Coverage. RTPI utilizes a systematic method for drilling down into finer granularity topics to a point where the black-box ML model classifies perturbed documents of a topic more or less identically to the original documents. This iterative process contributes to discovering all topics (regions) in a dataset and covering all documents by providing a high-quality explanation for each topic.

Quality. The iterative topic discovery process enhances the quality of the detected topics and increases an explanation's fidelity by directing the refining process based on feedback from the black-box ML model.

Regional explanation techniques herein address the above challenges. This novel class of explainers can be positioned in between the two extremes of local and global explainers and much better describe how a black-box ML model reacts to important subsets of documents. A regional NLP explainer should help identify significant semantic regions and the most important tokens (e.g., words, phrases, or n-grams [combination of multiple tokens]) contributing to the NLP model's predictions across multiple text documents in a detected region. This type of explanation is of particular interest when the regional explanation differs from the global explanation. Specifically, the regional explanation is complementary to the global explanation. For example, a text classification task may identify if a document is referring to the class of Space or Medicine. The word "space" could be important for both classes, but with different meanings that are only apparent within the context of surrounding text. A global explanation such as "space contributes to a classification of Space by the black-box model" could be complemented by a regional explanation such as "space in conjunction with NASA and shuttle is a significant indicator, but in conjunction with virus and self-isolation, space plays less of a role". This level of explanation based on a subset of topics gives insights into the distinctions that an ML model finds significant, which can then be compared to human intuition.

This region-based approach estimates token importance in terms of appropriately-segmented regions. Reliance on topics/regions avoids a need to compute local explanations for many or all documents in a dataset such as with other approaches. Avoiding the multiplicity of local explanations provides acceleration over other MLX techniques. By combining token attributions generated from various topics, a more topic-discriminative, interpretable, and visually immersive explanation is obtained. Few and highly influential topics based on few and highly influential terms increases accuracy and acceleration for NLP MLX. In other words, this region-based approach does not waste time nor risk accuracy by analyzing terms and topics of low relevance, which makes this approach quick and decisive. Key advantages and novelties of an end-to-end regional NLP explanation technique over other solutions include:

It is the first model-agnostic, regional NLP explainer that efficiently provides token importance-based explanations for ML models on text datasets.

It improves the explanation's interpretability over the existing global explanation techniques; i.e., it identifies the main regions of datasets and explains each region using a set of highly-related and strongly influential tokens. Such a topic-discriminative explanation is amenable to more compelling visualization.

It achieves the desired trade-off between interpretability and coverage compared to existing global explainers; i.e., unlike many of the existing global explainers, by discovering the regions (subtopics) in the dataset, RTPI's explanations represent a larger extent of the documents. For each identified region of the dataset, it provides a concise and interpretable explanation.

It addresses the token ambiguity problem, and consequently explanation ambiguity, by presenting important tokens alongside their context (i.e., other tokens).

It scales well with large amounts of data—that is, the explanation quality improves with more data without significantly impacting coverage or runtime performance.

It supports both supervised and unsupervised NLP models.

It has a flexible application program interface (API) that allows recompositing so that users may swap out nearly every internal processing stage (including a preprocessor or tokenizer) of the MLX pipeline with the internal stages of the black-box text processing pipeline to further improve explanation fidelity.

In an embodiment, a computer hosts a machine learning (ML) model that infers a respective original inference for each of many text documents that contain many distinct terms. To each text document is assigned, based on terms in the text document, a respective topic that contains a respective subset of the distinct terms. In a respective perturbed copy of each text document, a perturbed subset of the distinct terms is replaced. For the perturbed copy of each text document, the ML model infers a respective perturbed inference. For text documents of a particular topic, the computer detects that a difference between original inferences of the text documents of the particular topic and perturbed inferences of the text documents of the particular topic exceeds a threshold. Based on terms in the text documents of the particular topic, the particular topic is replaced with multiple, finer-grained new topics. After sufficient topic modeling, a regional explanation of the ML model is generated.

1.0 Example Computer

FIG. 1 is a block diagram that depicts an example computer 100, in an embodiment. Computer 100 applies novel techniques for topic modeling and content perturbation that provide machine learning explainability (MLX) for natural language processing (NLP). In particular, computer 100 generates regional explanations of machine learning (ML) inferencing such as for classification of text documents 111-113. Computer 100 may be one or more of a rack server such as a blade, a personal computer, a mainframe, a virtual computer, a smartphone, or other computing device.

Computer 100 stores text documents 111-113 in volatile or nonvolatile storage. Text documents 111-113 may be respective files, spreadsheets, records such as respective rows in a database table or spreadsheet, log entries such as respective lines of text in console output, messages such as instant messages or emails, scanned documents, speech to text transcripts, published articles, online manuals, or other containers of natural language such as English. Text documents 111-113 may conform to formats such as JavaScript object notation (JSON) or extensible markup language (XML). Techniques herein are agnostic as to form and format of text documents 111-113.

1.1 Text Processing

Text documents 111-113 contain terms such as T1-T14. Any term or text document may contain natural formats such as one or more words, phrases, sentences, and paragraphs. In an embodiment, each of terms T1-T14 may be a parsed token such as a word that is delimited by whitespace or punctuation. Techniques herein are agnostic as to granularity and parsing of terms and size of documents. For example, term T1 may be a word, a phrase, a multiword n-gram, or a sentence. In any case, text document 111 contains a sequence of terms, shown as original terms, that may include duplicates of a same term such as T2 as shown.

Computer 100 may have an exhaustive inventory of distinct terms that is a union of all of the terms in all of text documents 111-113. The exhaustive inventory may contain words that are always insignificant such as stop words such as some prepositions and articles. In any case, the exhaustive inventory may be filtered to provide a useful vocabulary that contains terms T1-T14, shown as filtered terms 130. Filtration of exhaustive inventory into useful vocabulary is implementation dependent. Techniques herein are agnostic as to how and how much filtration occurs.

1.2 Example Machine Learning Explainability (MLX) Subsystem

Figure 2:
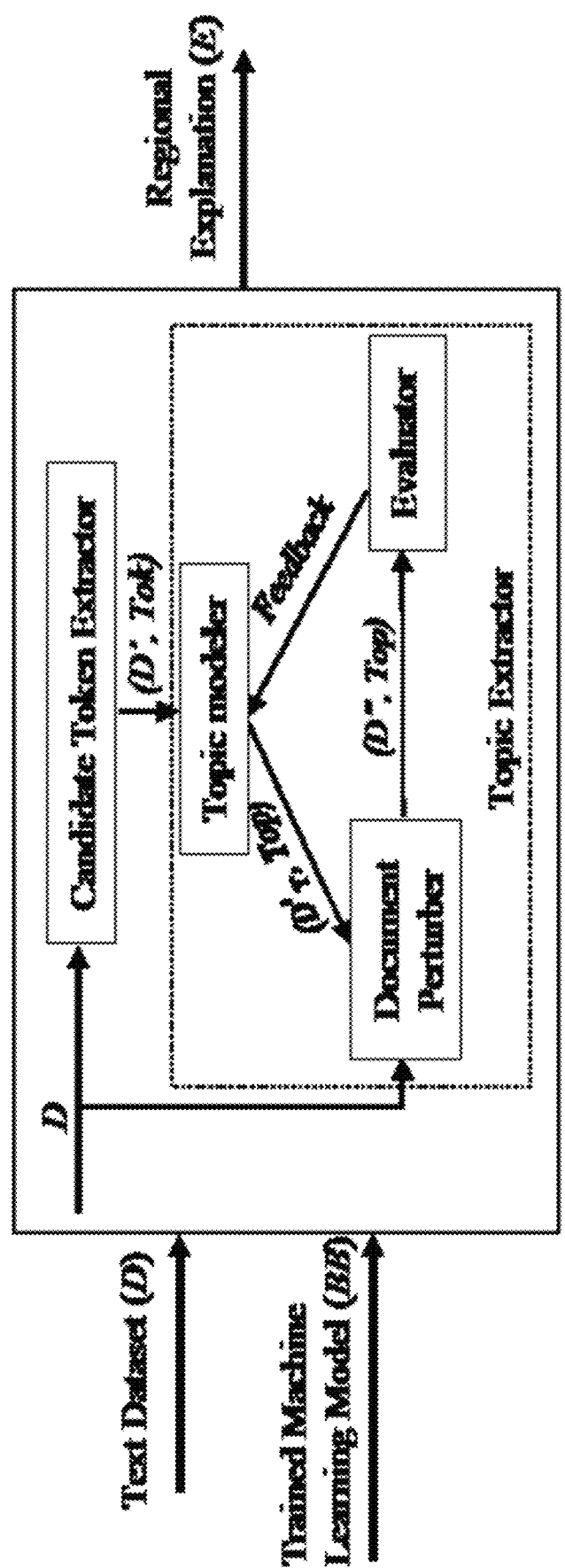
FIG. 2 is a block diagram that depicts an example MLX subsystem.

FIGS. 1-2 are discussed together as follows. FIG. 2 is a block diagram that depicts an example machine learning explainability (MLX) subsystem 200. In a demonstrative embodiment, computer 100 contains software such as MLX subsystem 200 that is composed of various software modules that cooperate as follows. Other embodiments of computer 100 and/or MLX subsystem 200 may have other internal compositions.

As shown in FIG. 2, computer 100 stores in memory and operates machine learning (ML) model BB that was already trained to classify text documents into predefined classes 121-123 of FIG. 1 that are explained later herein. Architectures and training techniques for ML models are discussed later herein.

In various scenarios, text documents 111-113 and their respective inferred classes are reviewed for various reasons. In one scenario, computer 100 generates regional explanation E, shown in FIG. 2, for why ML model BB inferred a class for text document 111 such as for MLX.

For example, regional explanation E may be needed for regulatory compliance. Likewise, regional explanation E may reveal an edge case that causes ML model BB to malfunction for which retraining with different text documents is needed. In another scenario, MLX subsystem 200 generates suggested replacements for some of terms T1-T14 that may cause ML model BB to make a same or different inference.

1.3 Black Box Model

A technical problem for such MLX is that ML model BB may be a black box (BB) that has an unknown or opaque architecture that more or less precludes direct inspection and interpretation of the internal operation of ML model BB. For example if ML model BB has an unknown architecture, computer 100 may be more or less unable to explain why ML model BB inferred the class of text document 111 nor which minor changes to text document 111 would cause a different class.

In an embodiment, the inference generated by ML model BB is the class of a text document, such as classes 121-123. In an embodiment, the inference generated by ML model BB is instead a score such as a probability and/or an anomaly score such as for anomaly detection. In an embodiment, the inference generated by ML model BB is instead a set of probabilities for each of many mutually exclusive possible classes 121-123. In an embodiment without classes 121-123, ML model BB is not a classifier but instead has another inferential role such as regression, anomaly detection, or prediction. Operation without classes nor classification is discussed later herein.

In various scenarios, a text document and its inferred class are reviewed for various reasons. In one scenario, computer 100 generates an explanation of why ML model BB inferred a class for text document such as for MLX.

MLX herein can provide combinations of any of the following functionalities:

- Explainability: The ability to explain the reasons behind ML model BB's inference
- Interpretability: The level at which a human can understand the explanation
- Local Explanations: Understand why ML model BB made a specific inference
- What-If Explanations: Understand how changes in a text document affects ML model BB's inference
- Model-Agnostic Explanations: Explanations treat ML model BB as a black box, instead of using properties from ML model BB to guide the explanation For example, the explanation may be needed for regulatory compliance. Likewise, the explanation may reveal an edge case that causes ML model BB to malfunction for which retraining with different data is needed.

1.4 Natural Language Processing (NLP) MLX

In operation, ML model BB infers, for one text document at a time, in which class does the text document belong. That is, ML model BB directly accepts as input a text document or indirectly receives data that was extracted from the text document such as stored in a feature vector. In reaction, ML model BB infers and outputs a class for the text document. For example, ML model BB may infer that text document 122 that is a literary novel belongs in class 121 that is science fiction. In another example, text document 122 may contain many occurrences of terms T3 and T8 that are words that respectively are laser and alien, which ML model BB may have learned to associate with a class such as science fiction.

A confounding factor may be that ML model BB may also have learned to associate laser and surgery with class 122 that is academic instead of fiction. In other words, how ML model BB reacts to laser may depend on context such as other terms in a same text document. Thus, explaining how and why ML model BB reacts in different ways for different text documents may be difficult. The difficulty of such MLX may be greater if ML model BB is a so-called black box with opaque internals that are hidden, undocumented, or over-complicated. For example, an ML model such as an artificial neural network (ANN) may have billions or trillions of coefficients that are applied to a feature vector that represents a text document to derive a single inference as a classification.

Likewise, an ML model may be trained with thousands or millions of text documents that each contain hundreds or thousands of terms from an exhaustive inventory of tens of thousands of available terms. Even when the exhaustive inventory is filtered to a useful vocabulary of hundreds or a few thousand available terms, such as filtered terms 130, each of those terms may be individually represented in a feature vector. Thus, each available term is a feature, and each feature provides a separate dimension in a multidimensional feature space that is a multidimensional problem space. Essentially, an ML model maps a multidimensional problem space to a solution space that is the set of predefined classes 121-123 that may instead contain hundreds or thousands of classes. For example, the United States patent and trademark office (USPTO) has over 400 classifications that may characterize a patent application. In other words, MLX for a trained natural language processing (NLP) ML model may be extremely difficult.

However, perhaps counterintuitively, NLP MLX may sometimes be harder when there are fewer classes. For example instead of direct classification, ML model BB may infer a score or probability that is classified into same or differently sized quantiles such that each quantile is a class. For example, news articles or news headlines or text transcripts of audiovisual news may be generally scored for tone or sentiment or specifically scored for relevance or competitive threat to a given company. For example, sentiment quantiles may be negative, neutral, and positive. An extreme example is binary classification, with or without quantiles, with only two classes such as anomalous or non-anomalous. For example, a threshold may separate two quantiles such that each line of text in a console log file or stream may be classified as anomalous or non-anomalous when monitoring datacenter health or network security.

1.5 Iterative Topic Modeling

To facilitate NLP MLX, computer 100 may generate and use topic model 140 that computer 100 may grow to contain many more topics than classes. Topic and class may be somewhat orthogonal categorizations. For example in a demonstrative embodiment, classes may represent application categories such as fiction, poetry, research, news, and conversation. Whereas in the demonstrative embodiment, topics may represent subject matter categories such as branches of science or commerce or industry, emotions or tones, or other actual details. Topics and classes may be orthogonal such that a same text document may incorporate multiple topics, and a same topic may be an indication of different or even opposite classes depending on what other topics accompany that topic in a same text document.

In any case, topics herein have the following important characteristics. First, a topic has finer granularity than a class such that there are more topics than classes. Second, a topic is defined be a unique set of significant terms that computer 100 must discover for each topic. Third, classes are predefined but topics are not predefined. In other words, computer 100 has to discover, by analytics herein, what are the topics and how many topics should there be.

In any case, discovered topics are organic, unlike classes that are artificially imposed. That is, topics are emergent from the original terms in text documents 111-113 and may or may not match preconceived expectations of familiar categories. In other words, topic modeling may be unsupervised as discussed later herein.

Topic model 140 grows more topics as follows. Initially, topic model 140 has no topics. Original terms in text documents are used in iterations to generate topics. Logically, an inner loop of iterations nested within an outer loop of iterations may be used for topic modeling such that there may be iterations within iterations as follows.

During each inner iteration, software shown in FIG. 2 as a topic modeler analyzes some or all original terms or original values for some or all of text documents 111-113 to propose a small set of new topics. Techniques herein are agnostic as to which topic modeler is used. In an embodiment, the topic modeler performs latent Dirichlet allocation (LDA) that may have various statistical implementations such as Monte Carlo, Gibbs, Bayes, and Markov. LDA or other topic modeler may be accelerated by focusing on original terms that are more influential. Ways to rank original terms based on their significance are presented later herein.

1.6 Topic Coherence

For a given outer iteration, in the first inner iteration the topic modeler proposes two new topics. As discussed later herein, each topic is scored for coherence in various ways that indicate how useful is the topic for explaining classification. If the aggregate (e.g. average as discussed later herein) score of the new topics proposed in an inner iteration exceeds an aggregate threshold, inner iteration ceases. Otherwise, a next inner iteration occurs that proposes a set of new topics that is larger by one than the set from the previous iteration.

In other words, each outer iteration tries to discover a smallest set of new topics that is coherent/useful. In an embodiment for an outer iteration, there is a maximum inner iteration. In other words, the proposed set of additional topics has a maximum size that cannot be exceeded in any outer iteration. In an embodiment, the maximum is the same as the amount of classes 121-123.

However, there need be no limit on how many topics are accumulated and retained from previous outer iterations. Thus, topic model 140 monotonically grows to have many more topics than classes 121-123. At the end of each outer iteration, the new additional topics are only those proposed by the last inner iteration of that outer iteration. Topics proposed in earlier inner iterations of that outer iteration are all discarded for lack of aggregate coherence.

However, an inner iteration may or may not propose again one or more topics that were previously proposed by an earlier iteration. In an extreme example, an inner iteration merely adds one new topic to the same set proposed by the previous inner iteration. In a more likely example, most or all of the topics proposed in an inner iteration were never before proposed.

1.7 Topic Incoherence

As explained above, inner iteration uses the topic modeler to propose sets of new topics until aggregate coherence is achieved. However even when a set of new topics has aggregate coherence, zero or more of the new topics in that set may be individually incoherent. An incoherent topic should not be incorporated into topic model 140. That is, topic model 140 should only contain coherent topics. During outer iteration, software shown as a topic extractor in FIG. 2 accumulates coherent topics into growing topic model 140.

Outer iteration occurs as follows and as shown in topic model 140. First is outer iteration 1 that needed only one inner iteration to achieve aggregate coherence in this example. Thus, only two topics TT1-TT2 are proposed during outer iteration 1.

Each topic is defined by the original terms that it contains. For example as shown, topic TT1 contains terms T2, T5, and T7. The terms in a topic are the few terms that are highly indicative of the topic. In other words, a text document may contain a topic if the original terms of the text document contain some of the terms of the topic. For example, the topic modeler may assign topic TT1 to text document 111 because the original terms of text document 111 contain one occurrence of term T7 and two occurrences of term T2. In various embodiments, different topics have same or different amounts of terms. For example as shown, all topics contain a same fixed amount of three terms.

In an embodiment, terms in a topic have respective weights such that one term in a topic may be more indicative of the topic than another term in the same topic. For example, the terms of a topic in topic model 140 may be shown as sorted by weight in descending order. For example, T5 has the most weight in topic TT1. However, a same term in different topics may have different respective weights. Use of weights are discussed later herein.

Topics TT1-TT2 have sufficient aggregate coherence because, as shown in bold, topic TT1 individually has sufficient semantic coherence but, as shown not in bold, topic TT2 individually lacks semantic coherence. For example, topic TT1 may have very excessive semantic coherence, and topic TT2 may have almost sufficient semantic coherence such that aggregate coherence is still achieved. Definitions and measurement for three different coherence metrics, including semantic coherence and aggregate coherence, are discussed later herein.

1.8 Subtopics

Because topic TT2 is incoherent, topic TT2 needs refinement. Specifically, topic TT2 should be reformulated into multiple new topics such as splitting into multiple subtopics. In any case, incoherent topic TT2 is discarded, as shown in not bold, and next outer iteration 2 occurs based on incoherent topic TT2.

A difference between outer iterations 1-2 is that, because outer iteration 1 is a first iteration, outer iteration 1 is based on terms that occur in any text document of all text documents 111-113. In other words, outer iteration 1 uses the whole vocabulary of useful terms, shown as filtered terms 130.

Shown text dataset D in FIG. 2 may be text documents 111-113 that collectively contain an exhaustive inventory of distinct terms that is a union of all of the terms in all of text documents 111-113, including useless terms such as stop words, as explained earlier herein. Also as explained earlier herein, a useful vocabulary, shown as filtered terms 130 in FIG. 1 and shown instead as Tok in FIG. 2, that contains distinct terms T1-T14 is extracted such as by software shown in FIG. 2 as a candidate token extractor that is discussed later herein. For example if each text document in text dataset D may be formatted as a sequence of occurrences of terms in the exhaustive inventory, then D' shown in FIG. 2 are sequences of occurrences of terms in useful vocabulary Tok such as original terms shown in text document 111. In other words, the candidate token extractor filters out useless terms such as stop words such that text dataset D is before filtration and D' is after filtration.

As explained above, outer iteration 1 uses the whole vocabulary of useful terms Tok, which is why Tok is shown as injected into the topic modeler from the candidate token extractor. Whereas outer iteration 2 uses fewer text documents and thus fewer terms as follows.

That is, each outer iteration has a respective set of text documents. First outer iteration 1 uses all text documents 111-113. Before discarding incoherent topics, an outer iteration detects which of the current text documents contain which of topic model 140's existing topics. Here, existing topics means all new topics (coherent and incoherent) proposed in the current outer iteration and all old topics not discarded as incoherent in previous outer iterations.

When multiple topics are assigned to a same text document, the outer iteration detects which of those topics is the primary topic of that text document. For example as discussed earlier herein, a topic has terms that have weights that are used to match the topic to text documents. In an embodiment, a weight of a term of a topic is a coefficient that is multiplied by a count of occurrences of that term in a text document to calculate a product. In an embodiment, the count of occurrences has a limit of one such that the count is either zero or one to respectively indicate absence or presence regardless of the actual count. In other embodiments, term metrics such as term frequency (TF), inverse document frequency (IDF), and/or TF-IDF may be used to weight terms as discussed later herein.

In any case for the text document, the respective products for each term of the topic are summed as a relevance score to indicate how strongly related are the text document and the topic. When a text document has multiple topics, the topic with the highest score is the primary topic of the text document. Thus, each text document may be assigned exactly one of topic model 140's existing topics. Likewise, each topic is the primary topic of a mutually exclusive set of text documents. That is, two topics do not share a same text document in their respective sets of text documents.

As explained above, outer iteration 1 generates incoherent topic TT2. Coherence measurement is discussed later herein. In any case, outer iteration 2 uses only text documents whose primary topic was TT2 and thus uses only terms contained in those text documents. Outer iteration 2 splits incoherent topic TT2 into three subtopics TT2.A-TT2.0 as shown. Thus, outer iteration 2 has two inner iterations that respectively proposed an aggregate incoherent set of two new topics (not shown) and then an aggregate coherent set of three new topics TT2.A-TT2.C.

As shown in not bold, topic TT2.0 is incoherent, and outer iteration 3 replaces incoherent topic TT2.0 with coherent topics TT2.C.1-TT2.C.2. Because all of the incoherent topics TT2 and TT2.0 have each been replaced with respective multiple coherent topics, outer iteration ceases such that outer iteration 3 is a final iteration. Topic model 140 finally contains only five coherent topics TT1, TT2.A-TT2.B, and TT2.C.1-TT2.C-2 as shown in bold. Thus, topic model 140 has five topics for computer 100 to use as discussed later herein.

As explained above, inner iteration is driven by aggregate coherence of a set of topics, which is based on respective semantic coherences of individual topics in the set. Whereas, outer iteration is based on respective perturbed coherences of topics.

2.0 Different Coherence Metrics

Herein are three contextually and functionally distinct coherence metrics: semantic coherence, aggregate coherence, and perturbed coherence. Semantic coherence is coherence of an individual topic based on statistical coincidence of terms in the topic and terms in a set of text documents. An example formula for measuring semantic coherence of a topic may be based on document co-occurrence counts, a one-preceding segmentation, and a logarithmic conditional probability as a confirmation measure, which are concepts presented and used in equation (1) in related non-patent literature (NPL) "Optimizing semantic coherence in topic models", Proceedings of the 2011 conference on empirical methods in natural language processing, pages 262-272, by David Mimno et al that is incorporated herein in its entirety.

Aggregate coherence is a statistic (e.g. average, minimum, maximum, or sum) that is based on the semantic coherences of a proposed set of new topics as discussed earlier herein. As discussed later herein, perturbed coherence is a statistic based on inferences by ML model BB for perturbed documents of a same topic.

In any case, topic model 140 monotonically grows new coherent topics as explained earlier herein. In other words, a coherent topic cannot become incoherent in a later outer iteration. Thus, semantic coherence and perturbed coherence need measurement only for newly proposed topics.

2.1 Document Perturbation

Because each inner iteration proposes new topics, each inner iteration measures the coherence of those topics as follows. Unlike other approaches, coherence measurement for a topic is not calculated by a single mathematical formula. Instead, measurement of perturbed coherence for a topic entails empirical observation based on perturbation analysis as follows.

As discussed earlier herein, computer 100 provides NLP MLX for ML model BB. A goal of perturbation analysis is to test how discovered topics affect inferencing by ML model BB. Unlike other approaches, perturbation of a text document is not random. Instead, contents of all text documents having a same primary topic are perturbed based on terms of that topic.

If the perturbation confuses ML model BB, ML model BB will reclassify a text document such that ML model BB's originally inferred class and the inferred class of the perturbed text document might differ. A few such confused reclassifications of text documents of the topic are tolerable, and the topic is deemed coherent. If so many confused reclassifications occur for the topic in excess of a threshold, then the topic individually lacks coherence. Mathematics of coherence measurement based on confused reclassifications are discussed later herein.

In any case, perturbation of text document 111 occurs as follows. In this example and although not shown, the primary topic of text document 111 is assigned to topic TT1 in outer iteration 1. Because topic TT1 is coherent, the primary topic of text document 111 does not change in later outer iterations 2-3. Thus, text document 111 is perturbed once based on topic TT1 and not perturbed again during topic modeling.

Perturbation entails generating a copy of text document 111 and perturbing the copy as follows. As shown, text document 111 has original terms. After perturbation, the copy has perturbed terms as shown and as follows.

Terms of topic TT1 that occur in text document 111 are unchanged in the copy. Thus as shown, two occurrences of term T2 and one occurrence of term T7 are the same in original terms and perturbed terms. Terms T1, T6, and T14 in text document 111 that are not in topic TT1 are replaced in the copy and shown as an X in the perturbed terms.

In an embodiment, X is one term that does not occur in any topic. In an embodiment, X may be a special and reserved term such as a dummy term that is not a real term. In an embodiment, X may be an insignificant but real term such as a stop word as discussed earlier herein. In any case in this example, X is always a same term regardless of which original term is being replaced. As discussed later herein, an embodiment may have more than one replacement term such that different original terms may have different respective replacement terms.

2.2 Confused Reclassification

In any case, contents of original text document 111 is shown as original terms, and contents of the perturbed copy is shown as perturbed terms such that the sequence of perturbed terms is not the same as the sequence of original terms. In other words, original text document 111 and its perturbed copy may be represented by different feature vectors. Thus, ML model BB may classify original text document 111 and its perturbed copy identically or differently.

Because ML model BB may be a black box as discussed earlier herein, the only way to detect whether a confused reclassification occurs between original text document 111 and its perturbed copy is to inject the perturbed document into the preprocessing pipeline (not shown) of ML model BB and then detect: a) which of class 121-123 does ML model BB infer for the perturbed document, and b) whether the originally inferred class and the perturbed class are the same or different. Thus in each inner iteration, for each topic in the proposed set of new topics: a) the new topic is assigned to zero or more text documents as a primary topic, and b) ML model BB is invoked with respective perturbed documents of the new topic. Based on that, perturbed coherence of each new topic is measured as discussed later herein.

Inner iteration is shown in FIG. 2 as three arrows arranged as a triangle that may operate as a dataflow graph that conducts data as follows. Before individual coherence of a topic is measured, a first arrow sends data from the topic modeler to software shown as a document perturber that performs perturbation as discussed earlier herein. The data of the first arrow includes $D'_T$ and Top as shown.

Topic Top is one new topic in the newly proposed set of topics whose individual coherence needs measurement. $D'_T$ is the sequences of original terms of the text documents that have topic Top as their primary topic as explained earlier herein. Invocation of the first arrow is repeated for each new topic in the proposed set of topics.

A second arrow sends data from the document perturber to software shown as an evaluator that provokes confused reclassifications as explained above and as follows. The data of the second arrow includes Top again and D" that is the perturbed copies of the text documents that have topic Top as their primary topic as explained earlier herein. From the perturbed copies of those text documents, the evaluator generates sequences of perturbed terms such as shown in text document 111 and as discussed earlier herein.

The evaluator: a) injects the perturbed documents into ML model BB, by way of ML model BB's preprocessing pipeline, for possible reclassification, b) counts confused reclassifications, and c) based on a count of reclassifications, measures/scores the individual coherence of topic Top. The second arrow is repeatedly invoked for each new topic in the proposed set of topics.

During an inner iteration, the evaluator has: a) behavior that is repeated for each new topic as explained above, and b) behavior that occurs only once, including measuring aggregate coherence of the newly proposed set of topics as explained earlier herein, after which a third arrow conditionally sends data from the evaluator to the topic modeler as follows. If aggregate coherence is achieved, inner iteration ceases and the third arrow is not invoked. Otherwise, a next inner iteration occurs by invoking the third arrow with data shown as feedback that includes a count, increased by one, of how many topics should be in the next set of new topics proposed by the topic modeler. For example as explained above, if an inner iteration proposes a set of two new topics that lacks aggregate coherence, then a next inner iteration should instead propose a set of three new topics.

In any case, cooperative topic modeling by the topic modeler and the topic extractor eventually finishes generating topic model 140. Topics generatively discovered and retained in topic model 140 are all coherent, and computer 100 then assigns multiple topics to each of text documents 111-113. Thus, computer 100 may have recorded metadata that specifies what are the class and topics of each of text documents 111-113. MLX subsystem 200 is ready to generate NLP explanations, such as shown regional explanation E, based on that metadata as discussed later herein.

3.0 Example Topic Modeling Process

Figure 3:
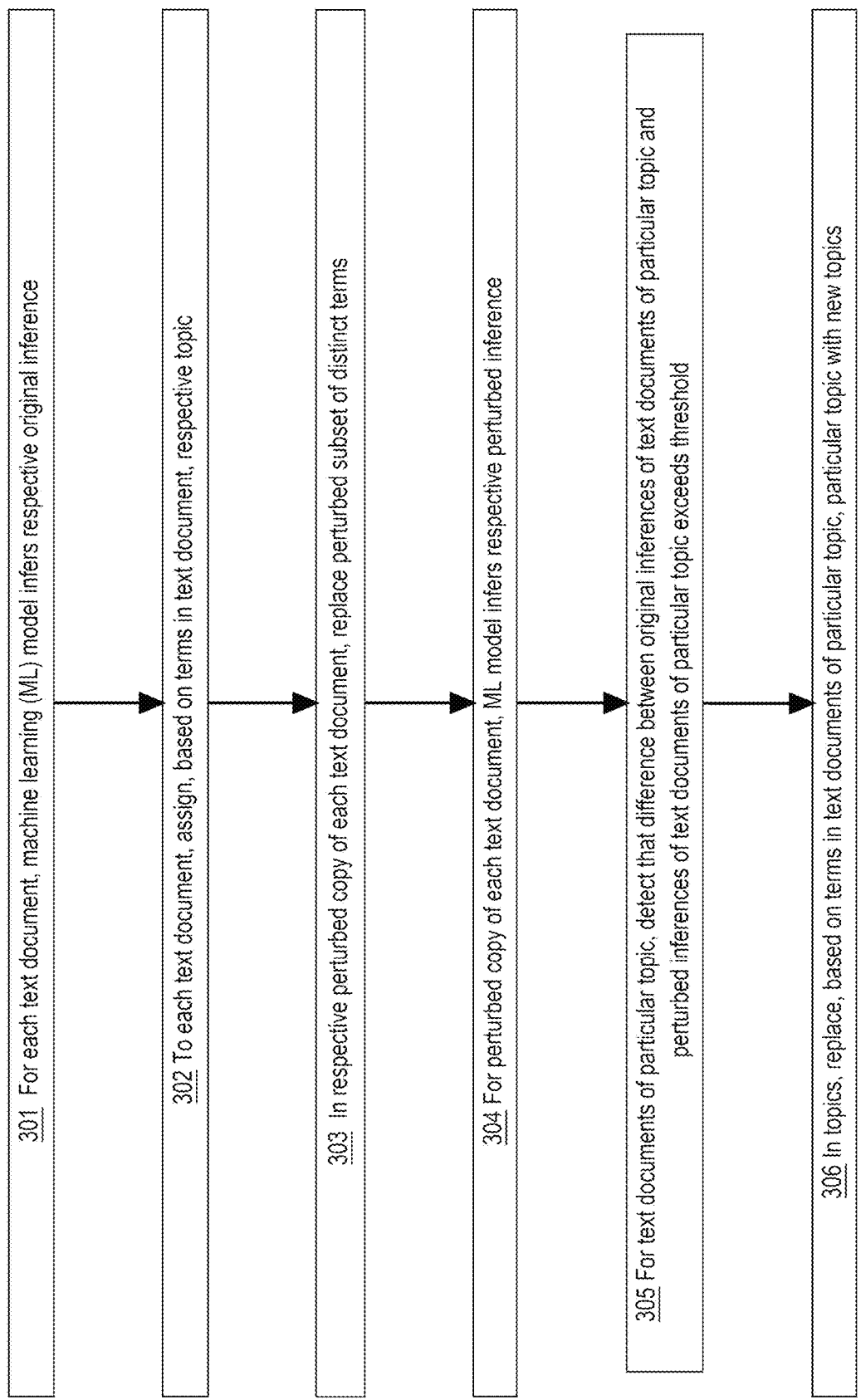
FIG. 3 is a flow diagram that depicts an example computer process for topic modeling and content perturbation that provide machine MLX for NLP.

FIG. 3 is a flow diagram that depicts an example process that an embodiment of computer 100 may perform for topic modeling and content perturbation to provide machine learning (ML) explainability (MLX) for natural language processing (NLP). FIG. 3 is discussed with reference to FIG. 1.

For each text document 111-113, ML model BB infers a respective original inference in step 301. For example, injection of a text document into the preprocessing pipeline of ML model BB, which may cause ML model BB to infer the class of the text document. Inferential classification of text documents by ML model BB is discussed earlier herein.

To each text document 111-113, step 302 assigns, based on original terms in the text document, a respective topic. For example as explained earlier herein, in outer iteration 1, the topic modeler may: a) propose topics TT1-TT2 that have aggregate coherence, and b) assign topic TT1 to text document 111 because the original terms of text document 111 contain one occurrence of term T7 and two occurrences of term T2. Assignment of topics to text documents and iterative topic modeling are discussed earlier herein.

Steps 303-304 occur during an inner iteration. In a respective perturbed copy of each text document, step 303 replaces a perturbed subset of distinct terms. As discussed earlier herein, perturbation entails generating a copy of text document 111 and perturbing the copy. Terms of topic TT1 that occur in text document 111 are unchanged in the copy. Thus as shown, two occurrences of term T2 and one occurrence of term T7 are the same in original terms and perturbed terms. Terms T1, T6, and T14 in text document 111 that are not in topic TT1 are replaced in the copy and shown as an X in the perturbed terms.

For each perturbed copy of text documents 111-113, ML model BB infers a respective perturbed inference in step 304. For example, the perturbed copy may be injected into the preprocessing pipeline of ML model BB, which may cause ML model BB to infer a class for the perturbed document that may or may not be the same as the class originally inferred in step 301.

For text documents of a particular topic, step 305 detects that a difference between original inferences of text documents of the particular topic and perturbed inferences of text documents of the particular topic exceeds a threshold. For example at the end of outer iteration 1, step 305 detects that topic TT2 is individually incoherent as discussed earlier herein.

In the topics of topic model 140, step 306 replaces, based on original terms in text documents of the particular topic, the particular topic with new topics. For example in outer iteration 2 as discussed earlier herein, step 306 replaces incoherent topic TT2 with topics TT2.A-TT2.0 that have aggregate coherence.

The steps of FIG. 3 achieve iterative topic modeling. The topics generatively discovered and retained in topic model 140 are all coherent, and computer 100 then assigns multiple topics to each of text documents 111-113. Thus, computer 100 may have recorded metadata that specifies what are the class and topics of each of text documents 111-113. Computer 100 is ready to generate NLP explanations based on that metadata as discussed later herein.

4.0 Term Ranking

Figure 4:
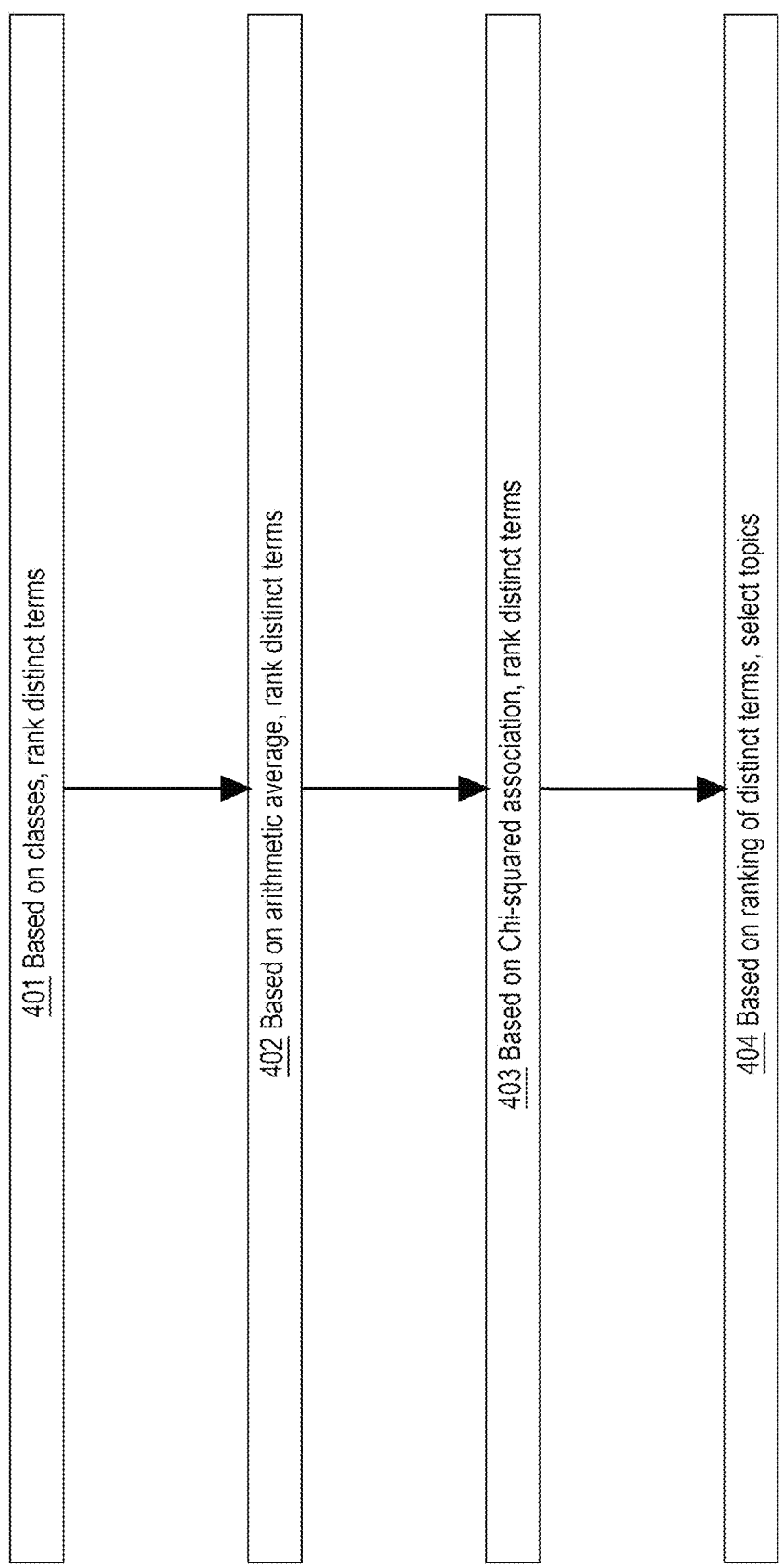
FIG. 4 is a flow diagram that depicts example activities for ranking available terms for topic modeling.

FIG. 4 is a flow diagram that depicts example computer activities for ranking available terms for topic modeling. FIG. 4 is discussed with reference to FIGS. 1-2.

As explained earlier herein, topic modeling entails iteratively proposing new topics. Topic modeling generates new topics faster and with increased relevance if the importance of available distinct terms is already measured. For example, filtered terms 130 may be scored and ranked for relevance as follows.

Steps 401-403 score filtered terms 130 in various ways. Combining any of steps 401-402 may or may not mean that multiple factors are used to measure a same or different score for a same term as discussed below. No matter which of steps 401-403 ranks filtered terms 130, the ranking entails sorting the terms by score such that a highest score indicates the most relevance.

5.0 Example Equations

FIGS. 4-5 are discussed together as follows. FIG. 5 depicts example mathematical equations 501-505. Scoring and ranking of terms may entail applying some or all of equations 501-505 as follows. FIG. 5 is discussed with reference to FIG. 1.

Based on classes 121-123, step 401 scores and ranks distinct terms of the useful vocabulary. As explained earlier herein, term frequency (TF) inverse document frequency (IDF), also known as TF-IDF and shown as tfidf in equation 501, may be used to measure a relevance score of a term. Calculating TF-IDF may entail separately measuring TF and IDF of a term.

Even though IDF is measured separately for each text document, each IDF is based on a set of text documents. However in an embodiment, the set of text documents that the IDF of a text document is based on is only the set of text documents that share the same class as originally inferred by ML model BB. In other words, an IDF herein is not based on all text documents 111-113. However because a same term may occur in text documents of different classes, the term may have a separate IDF and TF-IDF for each class 121-123. For example as shown in equation 501, $tfidf_{t,i,c_j}$ is the TF-IDF for term $t_i$ in text documents in class $c_j$.

Likewise, step 401 ranks terms based on only the set of text documents that share a same original class. For example, step 401 may select a fixed amount of highest scoring terms in each class and a same or different fixed amount of lowest scoring terms in each class. In other words, each class has its own ranking of terms.

In an embodiment, a relevance score is adjusted based on all classes such as follows. Based on an arithmetic average, step 402 scores and ranks filtered terms 130. As explained above, a term may have a separate IDF and TF-IDF for each class 121-123. In other words, a term has multiple TF-IDF scores. Likewise, each TF-IDF score is measured for a particular class.

To adjust that TF-IDF score for that particular class, step 402 may use equation 501 to average the TF-IDF scores of the term for all of the other classes and subtracts the average from the TF-IDF of the term for the particular class. In other words the relevance score, shown as $\delta_{i,cj}$ in equation 501, of term $t_i$ for class $c_j$ is an arithmetic difference between the TF-IDF of that term for that class and an average for that same term in the other classes, where other classes are shown as $m \neq j$ in equation 501. Ranking of terms in a class is based on the arithmetic difference from equation 501 instead of on raw/actual TF-IDF scores.

As explained above as a preface of ranking terms per class, step 401 may generate an index of which terms of filtered terms 130 respectively occur in which class(es). Thus, class terms are available for each of classes 121-123. After ranking terms, an embodiment of step 401 divides the class terms of a class into three equally or differently sized quantiles based on ranking.

A small quantile that contains the most relevant (i.e. highest ranking) terms of class j are shown as $T'_j$ in equation 502. A small quantile that contains the least relevant (i.e. lowest ranking) terms of class j are shown as $I'_j$ in equation 502. Between those two small extreme quantiles is a large middle quantile (not shown) that contains all other terms of class j.

Same quantiles of different classes may be combined as follows. As used in step 404 as explained later herein, the union of most relevant terms for all classes is shown as $T_1$ in equation 502. The union of least relevant terms for all classes is shown as $I_1$ in equation 502.

As explained above, class terms are a prerequisite of scoring and ranking by steps 401-402 that cooperate. Likewise, class terms are a prerequisite of step 403 that ranks distinct terms based on Chi-squared associations as follows. Thus, steps 401-402 together provide one way to score and rank terms, and step 403 provides a different way. An embodiment may implement one or both ways, which may be combined as discussed later herein.

Based on Chi-squared associations, step 403 ranks distinct terms as follows. Chi-square measures correlation of two sets, which for step 403 are: a) text documents of a class, and b) text documents of all other classes, which is why equation 503 says else. By applying equation 503, step 403 effectively binarily reclassifies text documents into two classes shown as zero and one.

For each of classes 121-123, step 403 repeats this binary reclassification of all text documents 111-113 and, using a known and not shown Chi-square statistic formula, step 403 can measure, based on text documents 111-113, correlations of both binary classes to each of all distinct terms. A term that usually occurs in text documents of one class and seldom occurs in text documents of all other classes should have a high Chi-square score for that one class. Each term has a respective Chi-square score for each of classes 121-123. For each class, step 403 ranks all terms by Chi-square score.

Equation 504 shows that step 403 can split the terms into three quantiles per class and combine the most relevant terms of each class into shown $T_2$, similar to equation 502 for steps 401-402. As explained above, steps 401-402 together provide one way to score and rank terms, and step 403 provides a different way. An embodiment that ranks both ways to provide two rankings will have two sets of most relevant terms, $T_1$ and $T_2$, that may be combined as shown in equation 505 to provide few terms Tok that are so useful for classification that topic modeling should use only Tok to efficiently and accurately generate topics. Because Tok is based on ranking(s) of distinct terms by equations 501-504, topic selection (i.e. topic modeling) in step 404 is effectively based on ranking of distinct terms.

6.0 Topic Modeling Activities

Figure 6:
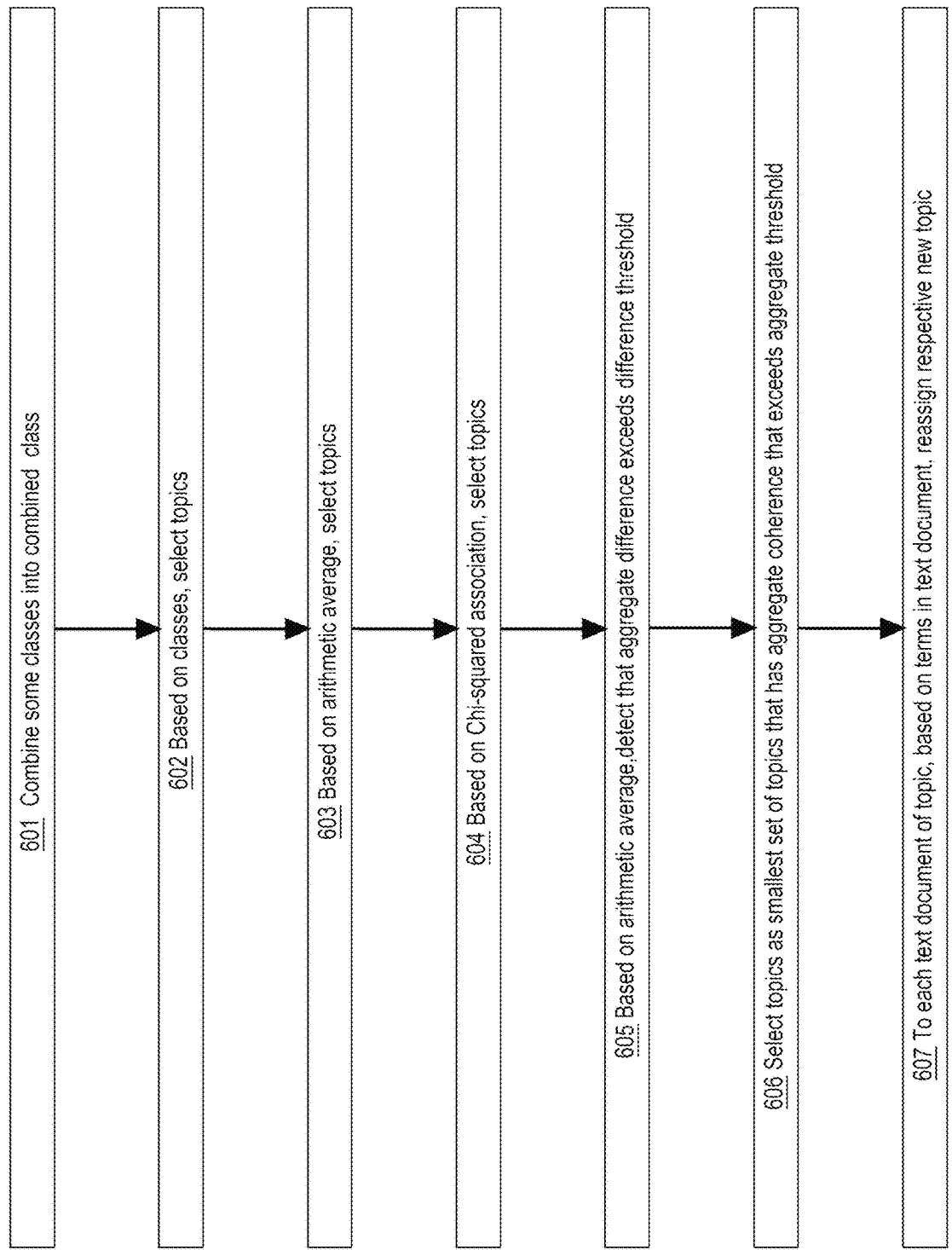
FIG. 6 is a flow diagram that depicts example computer activities for topic modeling.

FIG. 6 is a flow diagram that depicts example computer activities for topic modeling. FIG. 6 is discussed with reference to FIGS. 1 and 4-5.

Because topic modeling is based on most relevant terms Tok as explained above for steps 403-404 and equation 504 of FIGS. 4-5, steps 601-602 use those ways of selecting terms Tok as needed for generating topics. For example, steps 403-404 and 601 may be combined into a same step. According to equation 503, step 601 may combine some classes into a combined class such as when Chi-square association is based on binary classification where all but a first class are combined to synthesize a second class as explained above.

Based on classes 121-123, step 602 selects topics to propose while topic modeling. For example, topic modeling may be based on most relevant terms Tok according to various ways of ranking such as binary classification in steps 403-404 and/or TF-IDF in steps 401-402, and both of those ways are based on classes 121-123 and may facilitate step 602.

Based on an arithmetic average, step 603 selects topics to propose while topic modeling. For example according to equation 501 and step 401, step 603 may use most relevant terms Tok based on an average TF-IDF of multiple terms.

Based on Chi-squared association, step 604 selects topics to propose while topic modeling. For example, step 604 may use most relevant terms Tok that were selected by Chi-square association in steps 403-404.

As explained earlier herein, perturbed coherence is based on confused reclassification of perturbed documents of a topic. Reclassification means that the original text document and its perturbed copy are classified differently by ML model BB. Various embodiments variously measure a difference between an original classification and a perturbed classification. In an embodiment, the difference is one if the classification changes and zero if unchanged. In an embodiment that instead infers a respective probability for each of classes 121-123, then difference measurement may variously be based on: a) all of the probabilities of the many classes 121-123, or b) only the probability of the class with the highest originally inferred probability.

In any case, each text document in the topic may have a respective perturbed difference measurement. Based on an arithmetic average of those differences, step 605 may: a) calculate a combined difference that is the perturbed coherence of the topic as a scalar number, and b) detect that the perturbed coherence of the topic exceeds a difference threshold that indicates that the topic is individually incoherent and needs to be split into subtopics. Arithmetic averaging by step 605 may be implemented with mean square error (MSE) or a regression metrics such as R-squared.

Alternatives to calculating perturbed coherence by arithmetic average are instead using F1 score or recall for perturbed coherence. In any case, perturbed coherence is an error rate. Thus, the scale for perturbed coherence is the reverse of semantic coherence. For example, a high number indicates high semantic coherence, whereas a low number indicates high perturbed coherence.

Step 606 selects a smallest set of topics that has an aggregate coherence that exceeds an aggregate threshold. As explained earlier herein, aggregate coherence of a newly proposed set of topics may be an average of semantic coherences of the individual topics in the set during inner iteration for topic modeling. Also as explained earlier herein, inner iterations repeatedly propose new sets of topics until a set is proposed that has sufficient aggregate coherence according to an aggregate threshold. Also as explained earlier herein, the first inner iteration proposes the smallest set that has only two topics, and each subsequent iteration incrementally increases the set size by only one more topic per inner iteration. Thus, step 606 has a high likelihood of discovering a smallest possible set of new topics that has aggregate coherence.

To each text document in a topic, based on terms in the text document, step 607 reassigns a respective new topic. As explained earlier herein, an incoherent topic is discarded after being split into subtopics. Thus, all of the text documents in the discarded topic should be reassigned to a respective one of the subtopics in step 607.

7.0 Example Explanation

FIG. 7 depicts topics 700 that contains shown topics T.1-T.5. In one embodiment, topics 700 is a whole or partial topic model such as topic model 140 of FIG. 1. In another embodiment, topics 700 is instead regional explanation E of FIG. 2.

In any case, topics T.1-T.5 contain respective subsets of Tok that is the set of highly relevant terms that all topics are based on as explained above. Multiple topics such as T.1 and T.3 may share a same term such as earth. As shown, each term in each topic has a respective relevance score such as discussed above, and terms in a same topic are shown sorted by decreasing relevance. For example, space is the most relevant term in topic T.1.

As shown, those respective relevance scores are used as coefficients that operate as weights for terms. As shown in topic T.1, the arithmetic expression 0.408*space means that space is a variable whose value may be variously derived from a text document in various embodiments. As a variable, space may be: a) binarily zero or one based on presence of term space in the text document, b) a count of occurrences of space in the text document, or c) a TF or TF-IDF for term space for the text document.

If topics 700 is a whole or partial topic model, then visual ordering of topics T.1-T.5 in FIG. 7 is irrelevant. If topics 700 is instead regional explanation E, then: a) topics T.1-T.5 are the five highest scoring topics for the text document according to the weighting formulae shown in FIG. 7, and b) topics T.1-T.5 are visually sorted by decreasing relevance according to those weighting formulae.

The text document need not contain all terms in a topic. For example, regional explanation E may indicate that, as shown, topic T.1 is the most relevant topic for the text document even if the text document lacks term space. Various embodiments of regional explanation E may, in FIG. 7, variously: a) show terms present in the text document in bold, b) color or shade terms according to TF or TF-IDF, or c) hide terms that are absent in the text document. For example, topic T.1 shows nine terms but topic T.2 shows only eight terms, which in various embodiments may mean: a) topics may contain different amounts of terms, or b) terms absent in the text document of regional explanation E are hidden.

8.0 Explanation Generation

Figure 8:
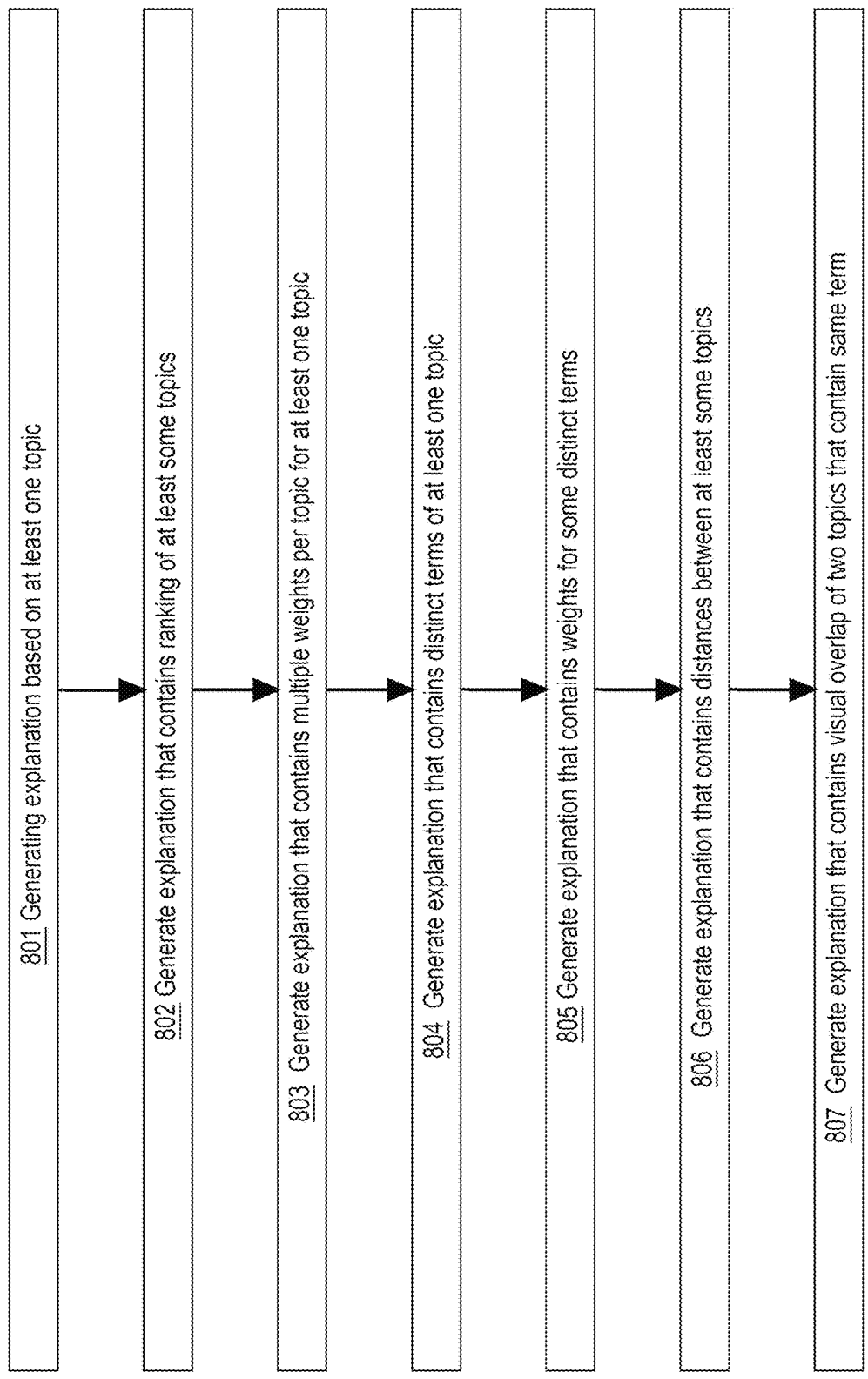
FIG. 8 is a flow diagram that depicts example computer activities for generating a regional explanation.

FIG. 8 is a flow diagram that depicts an example computer activities for generating regional explanation E. Various embodiments may implement one, some, or all of steps 801-807 that may be combined into a same step, in which case only one regional explanation E is generated. For example, an embodiment may perform both of steps 801-802 that cooperate to generate same regional explanation E. FIG. 8 is discussed with reference to FIG. 7.

As discussed earlier herein, topics 700 may be an implementation of regional explanation E, which steps 801-807 may cooperatively generate. In other words when discussing FIG. 8, topics 700 and regional explanation E are synonymous such that regional explanation E contains topics T.1-T.5 as shown in FIG. 7.

Step 801 generates regional explanation E based on at least one topic. For example as discussed earlier herein, topics 700 is based on topics T.1-T.5 as shown in FIG. 7.

Step 802 generates regional explanation E that contains a ranking of at least two topics. For example as discussed earlier herein, regional explanation E may contain a visual ordering of topics T.1-T.5 as shown in FIG. 7.

Step 803 generates regional explanation E that contains multiple weights per topic for at least one topic. For example as discussed earlier herein, each of topics T.1-T.5 contains multiple weights that are numeric constants as shown in FIG. 7.

Step 804 generates regional explanation E that contains distinct terms of at least one topic. For example as discussed earlier herein, each of topics T.1-T.5 contains multiple distinct terms as shown in FIG. 7.

Step 805 generates regional explanation E that contains weights for some distinct terms. For example as discussed earlier herein, each of topics T.1-T.5 contains multiple distinct terms with respective weights as shown in FIG. 7.

As shown in FIG. 7, regional explanation E may have a tabular presentation. Steps 806-807 instead provide a graphical presentation that may have at least two spatial dimensions.

Step 806 generates regional explanation E that contains distances between at least some topics. For example, distances between topics T.1-T.5 may be based on Jensen-Shannon divergence that: a) treats each topic as a probability distribution of terms or text documents, and b) pairwise compares, and quantifies as a distance measurement, the respective probability distributions of any two topics. For example if regional explanation E is for a particular text document, then (a) is the probability distribution (e.g. TF as discussed earlier herein) of terms of a topic in that text document. Distance between two topics may be presented as distance between respective centers of two objects that represent those topics such as circles or spheres.

Step 807 generates regional explanation E that contains visual overlap of two topics that contain a same term. For example because topics T.1 and T.3 both contain term earth, topics T.1 and T.3 may be presented as partially overlapping circles. If regional explanation E is for a text document that contains topics T.1 and T.3 but not earth, then various embodiments may or may not present overlapping based on earth.

9.0 Coherence Measurement

Figure 9:
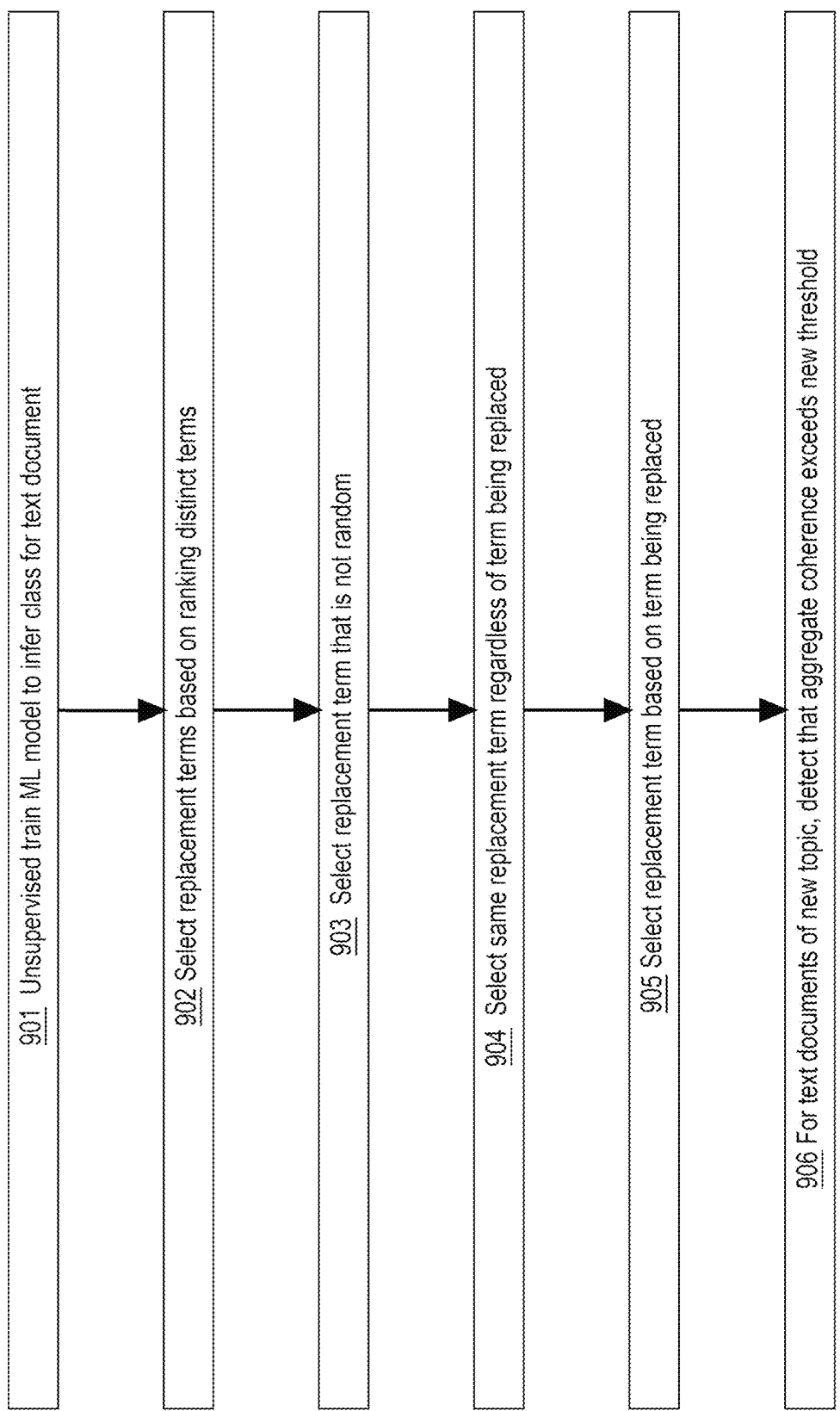
FIG. 9 is a flow diagram that depicts example computer activities for detecting coherence of an individual topic.

FIG. 9 is a flow diagram that depicts example computer activities for detecting coherence of an individual topic. FIG. 9 is discussed with reference to FIG. 7.

As explained earlier herein, a topic contains a small set of terms that have highest ranking relevance. Also as explained earlier herein, a topic contains text documents whose contained terms best match the terms of the topic, and individual coherence of that topic may be measured as a difference between inferred classes of those text documents before and after perturbation. Thus, training ML model BB is a prerequisite of document perturbation.

Step 901 unsupervised trains ML model BB to infer respective classes for text documents. Although classes 121-123 are predefined before training ML model BB, text documents used for training may be unclassified (i.e. unlabeled). For example, ML model BB may be an artificial neural network (ANN) such as an autoencoder whose training is unsupervised.

For example, classification of a text document by an autoencoder may entail the autoencoder inferring a respective score such as a probability for each of classes 121-123.

When ML model BB is untrained, ML model BB is unable to recognize that the text document corresponds to a class. Thus when untrained, ML model BB may infer more or less similar probabilities for each of classes 121-123 for the text document. Likewise when already trained, ML model BB instead infers a high probability for a class and low probabilities for the other classes for that text document. Implications of probabilistic classification of perturbed documents are discussed later herein.

In any case as explained earlier herein, perturbation entails replacing terms in a copy of a text document. Perturbation of a topic's text documents is based on the terms of the topic. For example in a text document, which terms are perturbed and which terms are used as replacements may or may not depend on various factors such as topic terms and/or term ranking.

Steps 902-905 provide various ways of selecting a replacement term. Various embodiments may implement one or some of steps 902-905 that may be combined into a same step, in which case only one term is selected as a replacement. For example, an embodiment may perform both of steps 902-903 that cooperate to provide a same replacement term.

Step 902 selects replacement terms based on ranking distinct terms. As discussed earlier herein, available terms may be separated into same or differently sized quantiles of relevance, and equation 505 provides a least relevant quantile that defines a set of insignificant terms shown as I. In an embodiment for document perturbation, step 902 selects a replacement term from insignificant terms I.

Step 902 may be an implementation of step 903 as follows. Unlike other approaches, step 903 selects a replacement term that is not random. For example step 902, which may implement step 903, does not use a random replacement term.

Step 904 selects a same replacement term regardless of the term being replaced. In various embodiments, the same replacement term is: a) a predefined term such as a stop word or a dummy term that is not a real term, or b) selected from insignificant terms I.

Step 905 selects a replacement term based on a term being replaced. For example to avoid generating out-of-distribution (i.e. unrealistic) perturbed documents, the replacement term may be a synonym of the replaced term. For example, computer 100 may contain and use a thesaurus. For example if ML model BB is based on analyzing sentences, synonyms may preserve sentence structure and meaning that avoids unnecessary linguistic loss such as: a) grammatical damage by replacing a noun with a verb, and b) semantic damage such as replacing a serial number with a personal name.

Steps 902-905 provide replacement term(s) for perturbing text documents of a topic. After perturbation and as explained earlier herein, ML model BB classifies the perturbed documents, which may reveal that the topic is incoherent and needs splitting into subtopics. As explained earlier herein, a new set of subtopics is proposed until inner iteration of topic modeling detects sufficient aggregate coherence. For example, for text documents of a topic, step 906 detects that aggregate coherence of a newly proposed set of topics exceeds a threshold.

As explained earlier herein, a first outer iteration of topic modeling is based on all useful terms in all text documents 111-113. Whereas, the purpose of subsequent outer iterations is only to split incoherent topics into subtopics. Thus, a subsequent outer iteration is based only on text documents of an incoherent topic that is being split into subtopics. In successive outer iterations, subtopics are further divided into ever smaller subtopics having fewer text documents until all incoherent topics are replaced only with coherent subtopics. As the set of involved text documents shrinks in subsequent outer iterations, so too does the set of involved terms, which may cause a shift in the range of semantic coherence measurements and, thus, a shift in measured aggregate coherence that does not actually mean that subtopics are becoming more coherent or less coherent. Thus, the aggregate coherence threshold used to detect coherence of a proposed set of new topics may need recalibration between outer iterations. Thus, step 906 uses a different aggregate coherence threshold in each outer iteration of topic modeling.

10.0 Unsupervised Topic Modeling

Figure 10:
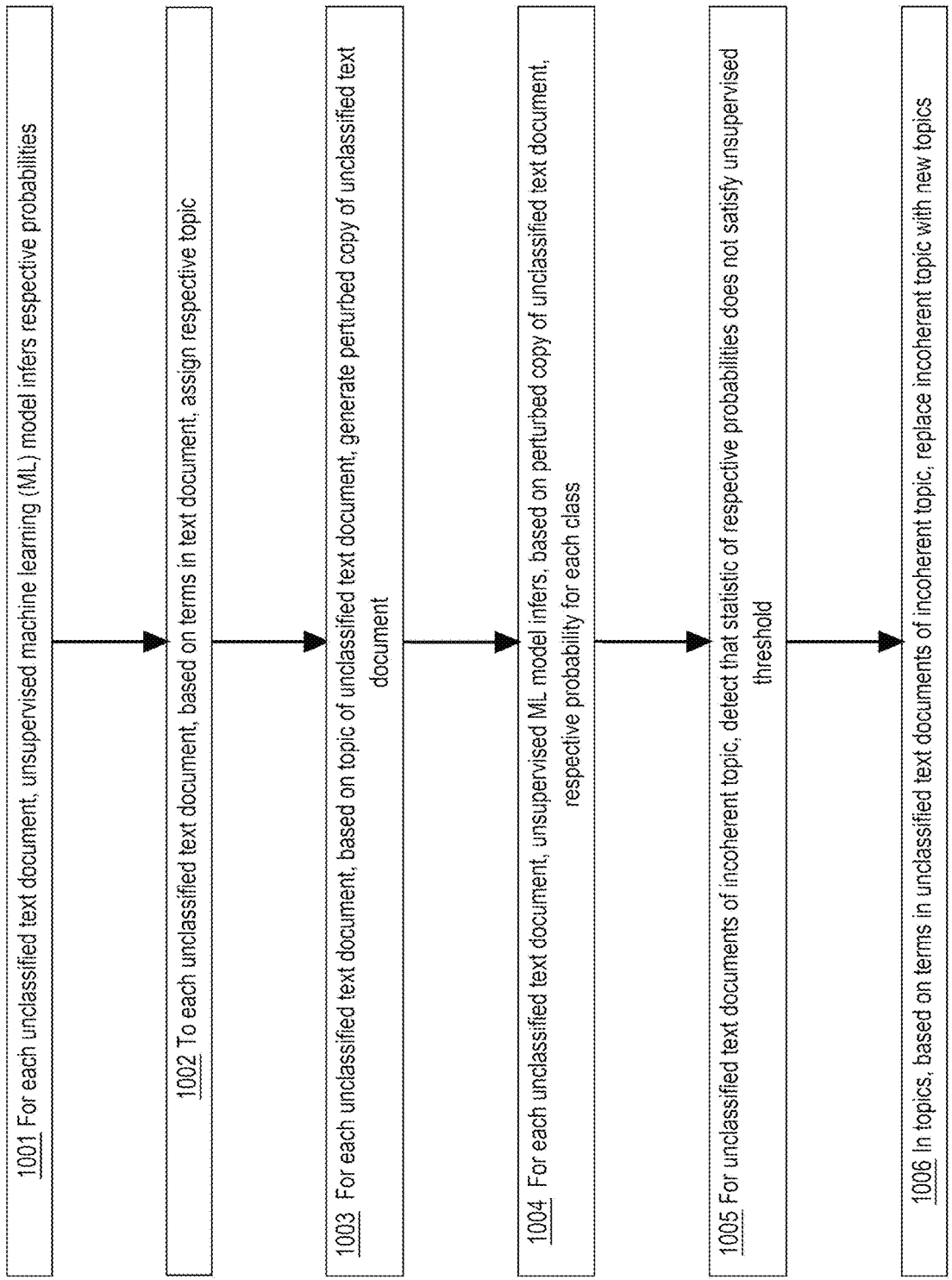
FIG. 10 is a flow diagram that depicts an example computer process for unsupervised topic modeling that does not use classes nor classification.

FIG. 10 is a flow diagram that depicts an example process that computer 100 may perform for unsupervised topic modeling that does not use classes nor classification. FIG. 10 is discussed with reference to FIG. 1.

As explained earlier herein, training of various embodiments of ML model BB may be supervised or unsupervised, where unsupervised training means that text documents 111-113 are initially unclassified (i.e. unlabeled). However after unsupervised training, ML model BB may classify text documents 111-113 into classes 121-123. Thus regardless of whether training is supervised or unsupervised, text documents 111-113 may already be classified when topic modeling begins and, indeed, many of the topic modeling techniques discussed earlier herein are based on text documents 111-113 belonging to respective classes.

In some embodiments, ML model BB performs regression or clustering instead of classification, in which case classes are never available and topic modeling should be unsupervised. For unsupervised topic modeling, training of ML model BB may be unsupervised, and text documents 111-113 are never classified. Unsupervised topic modeling occurs as follows and in a necessarily different way than presented earlier herein.

For each unclassified text document 111-113, unsupervised ML model BB infers a respective set of probabilities. For example as explained earlier herein, probabilistic classification may entail inferring, for a same text document, a probability for each of classes 121-123. However such semantics, such as a probability per class, are unused or unavailable for unsupervised topic modeling. That is in step 1001, for each unclassified text document, ML model BB infers a respective set of probabilities that are devoid of semantics for unsupervised topic modeling.

To each unclassified text document 111-113, based on original terms in the unclassified text document, step 1002 assigns a respective primary topic. A prerequisite of step 1002 is a set of topics that, in approaches presented earlier herein, were based on classes of text documents 111-113 that are instead unavailable for unsupervised topic modeling. For example, topics are generated for step 1002 by selecting relevant terms in any known way that is not based on classes of unclassified text documents 111-113 such as presented in related NPL "Optimizing semantic coherence in topic models".

For each unclassified text document 111-113, based on the primary topic of the unclassified text document, step 1003 generates a perturbed copy of the unclassified text document as discussed earlier herein. Perturbation is the same regardless of whether topic modeling is supervised or unsupervised, because perturbation is based on topics, not classes.

For each unclassified text document 111-113, based on the perturbed copy of the unclassified text document, unsupervised ML model BB infers a respective set of probabilities that are devoid of semantics for unsupervised topic modeling in step 1004.

As discussed earlier herein, instead with supervised topic modeling, perturbed coherence of a topic may be based on a respective difference, for each text document in the topic, that is measured in either of two ways: a) the difference is one if the classification of the text document changes and zero if unchanged by perturbation, orb) the difference is based on respective difference(s) of inferred probability(s) such as according to mean square error (MSE), a regression metrics such as R-squared, or F1 score or recall. Because (a) is based on classes, which unsupervised topic modeling does not use, only (b) is used when topic modeling is unsupervised in step 1005 that measures perturbed coherence for an incoherent topic.

For unclassified text documents in the incoherent topic, step 1005 detects that a statistic (e.g. minimum, maximum, sum, or average) of respective probability(s) does not satisfy an unsupervised threshold. Step 1005 uses the unsupervised threshold to detect that perturbation for a topic causes an excessive error rate for inferencing by unsupervised ML model BB. In other words, step 1005 facilitates unsupervised topic modeling by detecting, without any classification nor classes 121-123 nor supervision, that a topic is incoherent.

In topics of topic model 140, based on terms in unclassified text documents of the incoherent topic, step 1006 replaces the incoherent topic with new topics such as subtopics as discussed earlier herein. Classes 121-123, classification, and supervision are not used to: a) select terms for unsupervised topic modeling, b) generate topics and subtopics, c) measure semantic, aggregate, and perturbed coherence, nor d) detect when unsupervised topic modeling should cease.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
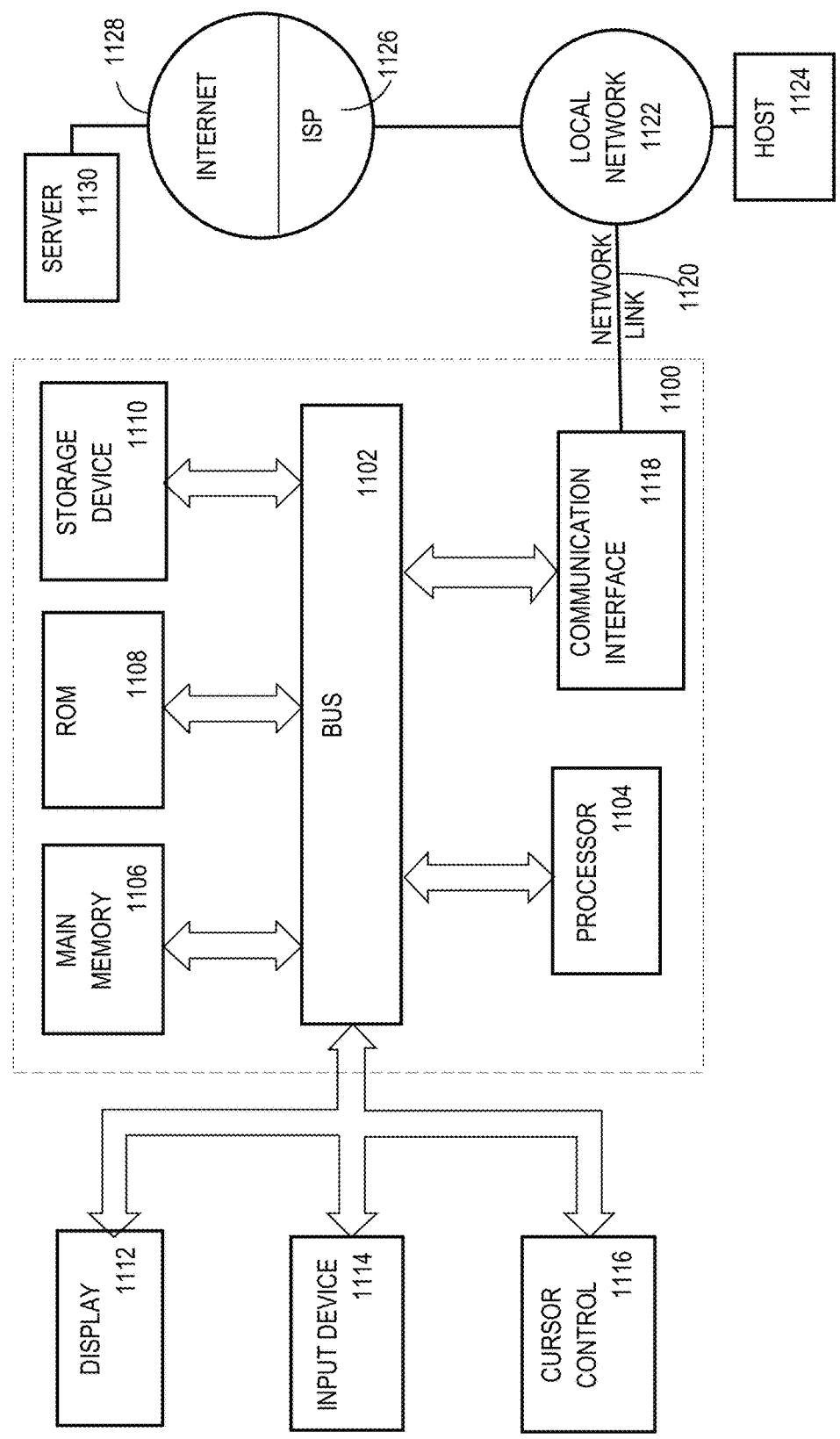
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Software Overview

Figure 12:
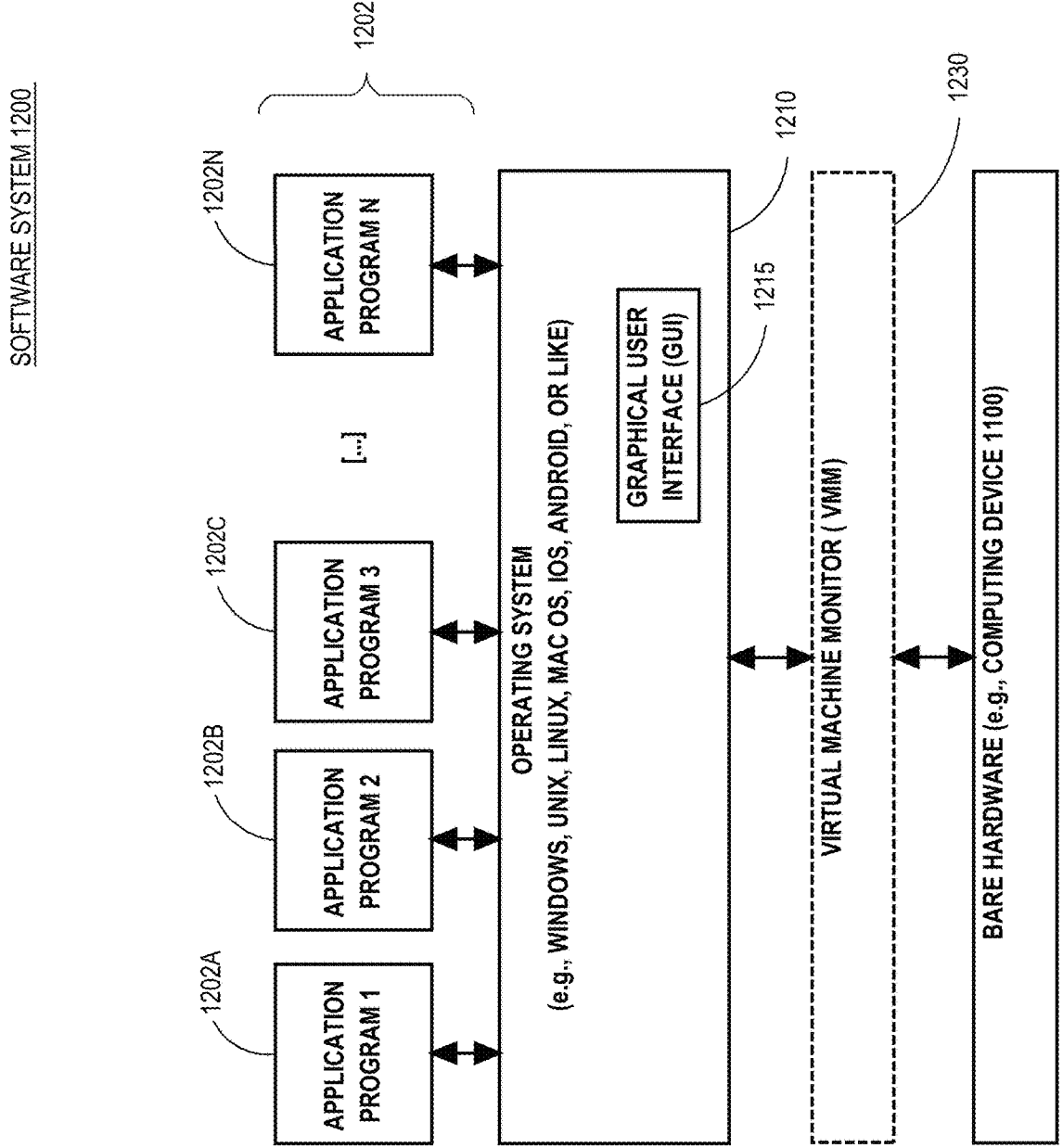
FIG. 12 is a block diagram that illustrates a basic software system that may be employed for controlling the operation of a computing system.

FIG. 12 is a block diagram of a basic software system 1200 that may be employed for controlling the operation of computing system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to infer an inference such as a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm. The machine learning model executes by executing the machine learning algorithm that implements the model. Thus, executing the machine learning model causes the model to infer an inference.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization class to each example. For example, the training set for optical character recognition may have blurry photographs of individual letters, and an expert may class each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to class training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which classes are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  inferring, by a machine learning (ML) model, for each text document in a plurality of text documents that contain a plurality of distinct terms, a respective original inference;
  assigning, to each text document in the plurality of text documents, based on terms in the text document, a respective topic of a plurality of topics, wherein the topic contains a respective subset of the plurality of distinct terms;
  replacing, in a respective perturbed copy of each text document in the plurality of text documents, a perturbed subset of the plurality of distinct terms without replacing, in said respective perturbed copy of each text document in the plurality of text documents, said subset of the plurality of distinct terms of the topic of the text document;
  inferring, by the ML model, for the perturbed copy of each text document in the plurality of text documents, a respective perturbed inference;
  detecting, for text documents of a particular topic of the plurality of topics, that a difference between original inferences of the text documents of the particular topic and perturbed inferences of the text documents of the particular topic exceeds a threshold;
  generating in response to said detecting, based on terms in the text documents of the particular topic, a plurality of new topics that said plurality of topics does not contain;
  discarding the particular topic; and
  generating, after said discarding, and displaying a regional explanation for the original inference for a text document of the plurality of text documents, wherein the regional explanation indicates a topic of the plurality of new topics;
  wherein the method is performed by one or more computers.

2. The method of claim 1 further comprising reassigning, to each text document of the particular topic, based on terms in the text document, a respective topic of the plurality of new topics.

3. The method of claim 1 further comprising detecting, for text documents of a particular new topic of the plurality of new topics, that an aggregate coherence exceeds a new threshold.

4. The method of claim 1 further comprising selecting the plurality of topics as a smallest plurality of topics that has an aggregate coherence that exceeds an aggregate threshold.

5. The method of claim 1 wherein:
  said original inference is an original class of a plurality of classes;
  said perturbed inference is a perturbed class of the plurality of classes;
  the plurality of topics contains a first topic and a second topic;
  the subset of the plurality of distinct terms of the first topic is larger than the subset of the plurality of distinct terms of the second topic.

6. The method of claim 5 wherein before said discarding the particular topic, the plurality of topics is smaller than the plurality of classes.

7. The method of claim 5 further comprising selecting the plurality of topics based on
  said plurality of classes.

8. The method of claim 7 wherein said selecting the plurality of topics comprises combining a subset of the plurality of classes into a combined class.

9. The method of claim 5 further comprising:
  ranking the plurality of distinct terms based on
    said plurality of classes;
  selecting the plurality of topics based on said ranking the plurality of distinct terms.

10. The method of claim 1 wherein at least one selected from a group consisting of:
  the plurality of topics is not predefined and
  a size of the plurality of topics is not predefined.

11. The method of claim 1 wherein:
  the method further comprises ranking the plurality of distinct terms;
  said replacing in said perturbed copy comprises selecting replacement terms based on said ranking the plurality of distinct terms.

12. The method of claim 1 wherein said replacing in said perturbed copy comprises selecting a same replacement term regardless of the term being replaced.

13. The method of claim 1 wherein said detecting that the difference exceeds the threshold is based on an arithmetic average.

14. The method of claim 1 further comprising generating an explanation that contains at least one selected from a group consisting of:
  a respective weight for each term of a subset of the plurality of distinct terms,
  multiple weights per topic for at least one topic of the plurality of topics,
  a ranking of at least a subset of the plurality of topics,
  distances between at least a subset of the plurality of topics, and
  visual overlap of two topics of the plurality of topics when said subsets of the plurality of distinct terms of the two topics contain a same term.

15. The method of claim 1 further comprising unsupervised training the ML model to infer, for a text document, a class of a plurality of classes.

16. The method of claim 15 wherein:
  said plurality of text documents consists of unclassified text documents;
  said original inference is a plurality of original probabilities;
  said perturbed inference is a plurality of perturbed probabilities;
  said assigning the respective topic to each text document of the plurality of text documents is not based on said plurality of classes.

17. One or more non-transitory computer-readable media storing instructions that, when executed by one or more processors, cause:
  inferring, by a machine learning (ML) model, for each text document in a plurality of text documents that contain a plurality of distinct terms, a respective original inference;
  assigning, to each text document in the plurality of text documents, based on terms in the text document, a respective topic of a plurality of topics, wherein the topic contains a respective subset of the plurality of distinct terms;
  replacing, in a respective perturbed copy of each text document in the plurality of text documents, a perturbed subset of the plurality of distinct terms without replacing, in said respective perturbed copy of each text document in the plurality of text documents, said subset of the plurality of distinct terms of the topic of the text document;

inferring, by the ML model, for the perturbed copy of each text document in the plurality of text documents, a respective perturbed inference;

detecting, for text documents of a particular topic of the plurality of topics, that a difference between original inferences of the text documents of the particular topic and perturbed inferences of the text documents of the particular topic exceeds a threshold;

generating in response to said detecting, based on terms in the text documents of the particular topic, a plurality of new topics that said plurality of topics does not contain;

discarding the particular topic; and generating, after said discarding, and displaying a regional explanation for the original inference from a text document of the plurality of text documents, wherein the regional explanation indicates a topic of the plurality of new topics.

18. The one or more non-transitory computer-readable media of claim 17 wherein:

said original inference is an original class of a plurality of classes;

said perturbed inference is a perturbed class of the plurality of classes;

the plurality of topics contains a first topic and a second topic;

the subset of the plurality of distinct terms of the first topic is larger than the subset of the plurality of distinct terms of the second topic.

19. The one or more non-transitory computer-readable media of claim 18 wherein before said discarding the particular topic, the plurality of topics is smaller than the plurality of classes.

20. The one or more non-transitory computer-readable media of claim 18 wherein the instructions further cause selecting the plurality of topics based on said plurality of classes.

21. The one or more non-transitory computer-readable media of claim 18 wherein the instructions further cause:

ranking the plurality of distinct terms based on at least one selected from a group ranking the plurality of distinct terms based on said plurality of classes;

selecting the plurality of topics based on said ranking the plurality of distinct terms.

22. The one or more non-transitory computer-readable media of claim 17 wherein at least one selected from a group consisting of: the plurality of topics is not predefined and a size of the plurality of topics is not predefined.

23. The one or more non-transitory computer-readable media of claim 17 wherein said replacing in said perturbed copy comprises selecting a same replacement term regardless of the term being replaced.

24. The one or more non-transitory computer-readable media of claim 17 wherein the instructions further cause generating an explanation that contains at least one selected from a group consisting of:

a respective weight for each term of a subset of the plurality of distinct terms, multiple weights per topic for at least one topic of the plurality of topics, a ranking of at least a subset of the plurality of topics, distances between at least a subset of the plurality of topics, and visual overlap of two topics of the plurality of topics when said subsets of the plurality of distinct terms of the two topics contain a same term.

* * * * *